United States Patent
Lu

(10) Patent No.: US 12,309,769 B2
(45) Date of Patent: May 20, 2025

(54) DISCONTINUOUS RECEPTION METHOD, TERMINAL DEVICE AND STORAGE MEDIUM

(71) Applicant: GUANGDONG OPPO MOBILE TELECOMMUNICATIONS CORP., LTD., Dongguan (CN)

(72) Inventor: Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 593 days.

(21) Appl. No.: 17/714,006

(22) Filed: Apr. 5, 2022

(65) Prior Publication Data
US 2022/0232596 A1 Jul. 21, 2022

Related U.S. Application Data

(63) Continuation of application No. PCT/CN2019/110214, filed on Oct. 9, 2019.

(51) Int. Cl.
*H04W 72/12* (2023.01)
*H04L 1/08* (2006.01)
(Continued)

(52) U.S. Cl.
CPC ........... *H04W 72/1268* (2013.01); *H04L 1/08* (2013.01); *H04L 1/1812* (2013.01); *H04W 72/23* (2023.01); *H04W 76/28* (2018.02)

(58) Field of Classification Search
CPC . H04W 72/1268; H04W 72/23; H04W 76/28; H04L 1/1812; H04L 1/1848; Y02D 30/70
See application file for complete search history.

(56) References Cited

U.S. PATENT DOCUMENTS 11,902,028 B2 * 2/2024 Xiong .................. H04W 76/27
12,022,394 B2 * 6/2024 Shi ..................... H04W 52/0216
(Continued)

FOREIGN PATENT DOCUMENTS

CN          103918200 A       7/2014
CN          109245866 A       1/2019
(Continued)

OTHER PUBLICATIONS

Guangdong OPPO Mobile Telecommunications Corp. Ltd., International Search Report and Written Opinion, PCT/CN2019/110214, Jul. 30, 2020, 17 pgs.

(Continued)

*Primary Examiner* — Ahmed Elallam
(74) *Attorney, Agent, or Firm* — Morgan, Lewis & Bockius LLP

(57) ABSTRACT

Disclosed is a discontinuous reception method, comprising: when a hybrid automatic repeat request (HARQ) function of an uplink HARQ process used for the transmission of uplink data is in a disabled state, after receiving an instruction to schedule a physical downlink control channel (PDCCH) for the transmission of the uplink data, and/or after sending a physical uplink shared channel (PUSCH) that carries the uplink data, a terminal device operating a discontinuous reception uplink retransmission timer corresponding to the uplink HARQ process. Further disclosed are another discontinuous reception method, a terminal device and a storage medium.

20 Claims, 11 Drawing Sheets

(51) Int. Cl.
*H04L 1/18* (2023.01)
*H04L 1/1812* (2023.01)
*H04W 72/1268* (2023.01)
*H04W 72/14* (2009.01)
*H04W 72/23* (2023.01)
*H04W 76/28* (2018.01)

(56) References Cited

U.S. PATENT DOCUMENTS

| | | | |
|---|---|---|---|
| 12,028,810 B2* | 7/2024 | Shi | H04W 52/0232 |
| 12,048,051 B2* | 7/2024 | Lu | H04L 1/1848 |
| 2016/0242231 A1* | 8/2016 | Vajapeyam | H04W 24/08 |
| 2018/0145798 A1* | 5/2018 | Suzuki | H04L 43/0864 |
| 2018/0294927 A1* | 10/2018 | Takeda | H04L 1/1861 |
| 2019/0268965 A1 | 8/2019 | Jang et al. | |
| 2020/0314948 A1* | 10/2020 | Babaei | H04L 5/0055 |
| 2022/0014315 A1* | 1/2022 | Kong | H04L 1/1896 |
| 2022/0190965 A1* | 6/2022 | Lin | H04L 1/1812 |
| 2022/0286235 A1* | 9/2022 | Ranta-Aho | H04L 1/1887 |

FOREIGN PATENT DOCUMENTS

| | | | | |
|---|---|---|---|---|
| CN | 110089061 A | | 8/2019 | |
| WO | WO-2020063782 A1 | * | 4/2020 | ........... H04L 1/1812 |
| WO | WO-2020107479 A1 | * | 6/2020 | |
| WO | WO-2020252708 A1 | * | 12/2020 | |
| WO | WO2021/068141 A1 | | 4/2021 | |
| WO | WO-2021056226 A1 | * | 4/2021 | |
| WO | WO-2021056313 A1 | * | 4/2021 | |
| WO | WO-2021056354 A1 | * | 4/2021 | |

OTHER PUBLICATIONS

Guangdong OPPO Mobile Telecommunications Corp. Ltd., EP19948274, Extended European Search Report, Sep. 23, 2022, 11 pgs.

OPPO, "Discussion on DRX operation in NTN", 3GPP TSG-RAN WG2 Meeting #107bis, Tdoc R2-1913336, Chongqing, China, Oct. 14-Oct. 18, 2019, 5 pgs.

LG Electronics Inc., "Discussion on DRX operation associated with disabling HARQ feedback", 3GPP TSG-RAN WG2 Meeting #107bis, Tdoc R2-1913869, Chongqing, China, Oct. 14-18, 2019, 2 pgs.

\* cited by examiner

DISCONTINUOUS RECEPTION METHOD, TERMINAL DEVICE AND STORAGE MEDIUM

CROSS-REFERENCE TO RELATED APPLICATION

This application is a continuation of PCT Application No. PCT/CN2019/110214, filed Oct. 9, 2019, the entire contents of which are incorporated herein by reference.

TECHNICAL FIELD

The present disclosure relates to mobile communication technology, and particularly, to a discontinuous reception method, a terminal device and a storage medium.

BACKGROUND

Non terrestrial communication network (Non Terrestrial Network, NTN) provides communication services to terrestrial users by means of communication satellite communication. Compared with terrestrial cellular network communication, communication satellite communication has many unique advantages, such as: not restricted by the user's geographical area, long communication distance, and high stability. However, in the terrestrial cellular network communication, the signal transmission time between the terminal and the base station is short, and the propagation delay is small. In NTN, the signal transmission time between the terminal and the communication satellite is long, and the propagation delay increases significantly. Therefore, there is a situation in which the Hybrid Automatic Repeat reQuest (HARQ) function of the HARQ process is disabled. How to ensure the continuity of data transmission without increasing the number of HARQ processes becomes a technical problem to be solved.

SUMMARY

The embodiments of the present disclosure provide a discontinuous reception method, a terminal device and a storage medium, which can ensure data transmission continuity without increasing the number of HARQ processes in the case that the HARQ function of the HARQ process is disabled.

In a first aspect, the embodiment of the present disclosure provides a discontinuous reception method, including:

running, by a terminal device, a DRX uplink retransmission timer corresponding to an uplink HARQ process used for transmitting uplink data, after receiving a physical downlink control channel (PDCCH) indicating scheduling of transmission of the uplink data and/or after sending a physical uplink shared channel (PUSCH) carrying the uplink data, in a case that an HARQ function of the uplink HARQ process is in a disabled state.

In a second aspect, the embodiment of the present disclosure provides a discontinuous reception method, including:

running, by a terminal device, a DRX downlink retransmission timer corresponding to a downlink HARQ process used for transmitting downlink data, after receiving a PDCCH indicating scheduling of transmission of the downlink data and/or after receiving a physical downlink shared channel (PDSCH) carrying the downlink data, in a case that an HARQ function of the downlink HARQ process is in a disabled state.

In a third aspect, the embodiment of the present disclosure provides a terminal device, including:

a first uplink control unit, configured to run a DRX uplink retransmission timer corresponding to an uplink HARQ process used for transmitting uplink data, after receiving a PDCCH indicating scheduling of transmission of the uplink data and/or after sending a PUSCH carrying the uplink data, in a case that an HARQ function of the uplink HARQ process is in a disabled state.

In a fourth aspect, the embodiment of the present disclosure provides a terminal device, including:

a first downlink control unit, configured to run a DRX downlink retransmission timer corresponding to a downlink HARQ process used for transmitting downlink data, after receiving a PDCCH indicating scheduling of transmission of the downlink data and/or after receiving a PDSCH carrying the downlink data, in a case that an HARQ function of the downlink HARQ process is in a disabled state.

In a fifth aspect, the embodiment of the present disclosure provides a terminal device, including: a processor and a memory for storing a computer program executable on the processor, wherein the processor is configured to, when running the computer program, execute the steps of the discontinuous reception method performed by the foregoing terminal device.

In a sixth aspect, the embodiment of the present disclosure provides a storage medium, where the storage medium stores an executable program, and the executable program is executed by a processor to implement the discontinuous reception method performed by the foregoing terminal device.

The discontinuous reception method provided by the embodiments of the present disclosure includes: in a case that an HARQ function of the uplink HARQ process used for transmitting uplink data is in a disabled state, running, by a terminal device, a DRX uplink retransmission timer corresponding to an uplink HARQ process, after receiving a PDCCH indicating scheduling of transmission of the uplink data and/or after sending a PUSCH carrying the uplink data; or in a case that an HARQ function of the downlink HARQ process used for transmitting downlink data is in a disabled state, running, by a terminal device, a DRX downlink retransmission timer corresponding to a downlink HARQ process, after receiving a PDCCH indicating scheduling of transmission of the downlink data and/or after receiving a PDSCH carrying the downlink data. Therefore, the uplink/downlink discontinuous reception retransmission timer corresponding to the uplink/downlink HARQ process used by the uplink/downlink data is controlled based on the PDCCH indicating the scheduling of transmission of the uplink/downlink data and the sent PUSCH or received PDSCH, and the transmitted uplink/downlink data is monitored, which can ensure the continuity of data transmission without increasing the number of HARQ processes when the HARQ function of the HARQ process is disabled.

DETAILED DESCRIPTION

To enable a more detailed understanding of the features and technical content of embodiments of the present disclosure, the implementation of the embodiments of the present disclosure will be described in detail below in conjunction with the accompanying drawings. The accompanying drawings are provided for illustrative purposes only and are not intended to limit the embodiments of the present disclosure.

Before a detailed description of the discontinuous reception method provided by the embodiments of the present disclosure, a brief description is given of the Discontinuous Reception (DRX) in the New Radio (NR) system or NR network.

Figure 1:
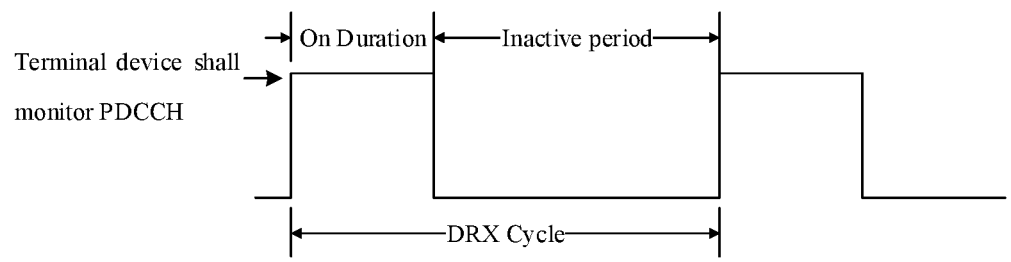
FIG. 1 is a schematic diagram of an optional DRX cycle of discontinuous reception according to the present disclosure.

In NR, the network device may configure DRX function for the terminal device, so that the terminal can monitor Physical Downlink Control Channel (PDCCH) discontinuously to achieve the purpose of power saving of the terminal device. The basic mechanism of DRX is to configure one DRX cycle for the terminal device. As shown in FIG. 1, the DRX cycle consists of an active period (On Duration) and a dormancy period (Opportunity for DRX), during the On Duration, the terminal device monitors and receives PDCCH; and during the Opportunity for DRX, the terminal device does not receive data from downlink channel to save power consumption.

As shown in FIG. 1, in the time domain, time is divided into successive DRX Cycles.

Each Media Access Control (MAC) entity has one DRX configuration, which includes:

duration timer (onDuration Timer): specifies the continuous duration of the PDCCH to be monitored (i.e., the duration of the activation period), counting from the start subframe of the DRX cycle;

start amount of the DRX cycle (drxStartOffset): specifies the starting time of the DRX cycle;

DRX inactivity timer (drx-InactivityTimer): indicates the continuous duration of the activation period after the terminal device successfully decodes one PDCCH indicating the initial transmission of UL or DL user data;

DRX downlink retransmission timer (drx-RetransmissionTimerDL): specifies the maximum duration of continuous monitoring of PDCCH from the time when the terminal device expects to receive downlink retransmission, where each downlink HARQ process except the broadcast process corresponds to one drx-RetransmissionTimerDL;

DRX uplink retransmission timer (drx-RetransmissionTimerUL): specifies the maximum duration from the subframe where the terminal device expects to receive the grant of uplink retransmission, where each uplink HARQ process corresponds to one drx-RetransmissionTimerUL;

DRX long cycle start offset (drx-LongCycleStartOffset): specifies two parameters, i.e., drx-StartOffset and long DRX Cycle Duration (longDRX-Cycle), where longDRX-Cycle specifies the duration of one long DRX cycle;

DRX HARQ downlink round trip time timer (drx-HARQ-RTT-TimerDL): specifies the minimum length of time from sending an acknowledgment (ACK)/non-acknowledgment (NACK) feedback to expecting the MAC entity to allocate HARQ retransmission, where each downlink HARQ process other than the broadcast process corresponds to one drx-HARQ-RTT-TimerDL;

DRX HARQ uplink round trip time timer (drx-HARQ-RTT-TimerUL): specifies the minimum sub-length of time from sending uplink data to expecting the MAC entity to grant uplink HARQ retransmission, where each uplink HARQ process corresponds to a drx-HARQ-RTT-TimerUL.

Optionally, the DRX configuration also includes:

short DRX cycle duration (drx-ShortCycle): specifies the duration of one short DRX cycle;

short DRX cycle timer (drx-ShortCycleTimer): specifies how long the terminal device uses the short cycle, and the value of which is a multiple of drx-ShortCycle.

The selection of DRX cycle needs to consider the balance between battery and latency. From one aspect, a long DRX cycle is beneficial for extending the usage time of the battery of the terminal device. For example, in web browsing, when the user is reading a downloaded web page, it is a waste of resources if the terminal device continues to receive downlink data at this time. On the other hand, when there is a new data transmission, a relatively short DRX cycle is beneficial for a relatively fast response. In order to meet the above requirements, the terminal device may be configured with two DRX cycles: a long DRX cycle and a short DRX cycle.

If the terminal device is configured with DRX, the terminal device needs to monitor the PDCCH during the DRX activation period. The DRX activation period includes the following situations:

any one of the following five timers, i.e., drx-onDurationTimer, drx-InactivityTimer, drx-RetransmissionTimerDL, drx-RetransmissionTimerUL, and random access contention resolution timer (ra-ContentionResolutionTimer), is running;

a Scheduling Request (SR) is sent on the Physical Uplink Control Channel (PUCCH) and is in a pending state;

one initial transmission indicated by a PDCCH scrambled by C-RNTI has not been received after a random access response is successfully received during a contention-based random access procedure.

The terminal device determines the time to start drx-onDurationTimer according to whether it is currently in the short DRX cycle or the long DRX cycle.

If the short DRX cycle is used and the current subframe satisfies equation (1), or if a long DRX cycle is used and the current subframe satisfies equation (2), the drx-onDurationTimer is started at the moment after drx-SlotOffset slots from the beginning of the current subframe.

$$[(SFN \times 10) + \text{subframe number}] \bmod (\text{drx-ShortCycle}) = (\text{drx-StartOffset}) \bmod (\text{drx-ShortCycle}) \quad \text{equation (1)};$$

$$[(SFN \times 10) + \text{subframe number}] \bmod (\text{drx-LongCycle}) = \text{drx-StartOffset} \quad \text{equation (1)};$$

where SFN is the system frame number.

The condition for the terminal device to start or restart the drx-InactivityTimer is as follows.

The terminal starts or restarts the drx-InactivityTimer if the terminal device receives one PDCCH indicating a downlink or uplink initial transmission.

The condition for the terminal device to start and stop the drx-RetransmissionTimerDL is as follows.

When the terminal device receives one PDCCH indicating a downlink transmission, or when the terminal device receives one MAC Packet Data Unit (PDU) on a configured downlink grant resource, the terminal device stops the drx-RetransmissionTimerDL corresponding to the HARQ process. The terminal device starts the drx-HARQ-RTT-TimerDL corresponding to the HARQ process after completing the transmission of the HARQ process feedback for this downlink transmission.

If the timer drx-HARQ-RTT-TimerDL corresponding to a certain HARQ of the terminal device times out and the decoding of the downlink data transmitted using the HARQ process is unsuccessful, the terminal device starts the drx-RetransmissionTimerDL corresponding to this HARQ process.

The condition for the terminal device to start and stop drx-RetransmissionTimerUL is as follows.

When the terminal device receives one PDCCH indicating an uplink transmission, or when the terminal device sends one MAC PDU on a configured uplink grant resource, the terminal device stops the drx-RetransmissionTimerUL corresponding to the HARQ process. The terminal device starts the drx-HARQ-RTT-TimerUL corresponding to the HARQ process after completing the first repeat transmission (repetition) of the PUSCH.

If the timer drx-HARQ-RTT-TimerUL corresponding to a certain HARQ of the terminal device times out, the terminal device starts the drx-RetransmissionTimerUL corresponding to this HARQ process.

It can be seen from the above DRX process that the terminal device may first start one DRX HARQ Round Trip Time (RTT) timer (drx-HARQ-RTT-TimerUL for uplink transmission, drx-HARQ-RTT-TimerDL for the feedback of downlink transmission) after completing the uplink transmission or the feedback of HARQ process for downlink transmission. When the DRX HARQ RTT timer is running, the terminal device is in a dormant state and does not monitor the PDCCH. After the timer expires, the terminal device starts monitoring the uplink retransmission scheduling or determines whether to start monitoring the downlink retransmission scheduling according to the feedback. The drx-HARQ-RTT-TimerUL and drx-HARQ-RTT-TimerDL are semi-statically configured by Radio Resource Control (RRC).

In NR, both uplink and downlink support the HARQ function. Therefore, two timers, i.e., drx-HARQ-RTT-TimerUL and drx-HARQ-RTT-TimerDL, are used in the DRX process. These two timers reflect the minimum time interval required by the terminal device from uplink transmission to reception of the retransmission scheduling issued by the network device, that is, the time of one RTT.

Compared with the cellular network adopted by NR, the signal propagation delay between the terminal device and the network device in NTN is significantly increased. In order to ensure the continuity of data transmission without increasing the number of HARQ processes, the following schemes may be adopted.

1. The network device may configure whether to enable the HARQ function.

2. If the HARQ function is in an off state (disabled), the terminal device does not need to send HARQ feedback for the PDSCH to the network device, and the HARQ feedback is disabled.

3. In the case that HARQ feedback is disabled, the terminal device still supports HARQ retransmission so as to ensure the reliability of data transmission.

4. The configuration that the HARQ function is in an on state (enabled) or the off state is performed based on the terminal device or based on the HARQ process. For the configuration based on the terminal device, the HARQ functions of all HARQ processes of the terminal device are configured to be simultaneously in the on state or the off state. For the configuration based on HARQ process, for a plurality of HARQ processes of one terminal device, the HARQ functions of a part of the HARQ processes may be configured to be in the on state, and the HARQ functions of another part of the HARQ processes may be configured to be in the off state.

For one HARQ process, in the case that the HARQ function of the HARQ process is disabled, the possible impact on the DRX process includes the follows.

(1) If the HARQ function of the HARQ process is turned off, there is no HARQ feedback for PDSCH: the network device may continue to schedule the retransmission of the uplink transmission or the downlink transmission before receiving the uplink transmission of the terminal device or in the case that feedback for the downlink transmission is not received. For uplink data transmission, the terminal device may continue to receive the scheduling of uplink retransmission after sending the current uplink transmission. For downlink data transmission, the terminal device may continue to receive the scheduling of downlink retransmission before completing the decoding of the current downlink transmission. Therefore, the uplink/downlink HARQ process with HARQ function being turned off may eliminate the need for the timer drx-HARQ-RTT-TimerUL or drx-HARQ-RTT-TimerDL.

(2) For the discontinuous reception retransmission timer (drx-RetransmissionTimerUL for uplink transmission and drx-RetransmissionTimerDL for downlink transmission), based on the current DRX process, for uplink transmission, drx-RetransmissionTimerUL is started after drx-HARQ-RTT-TimerUL times out, and for downlink transmission, drx-RetransmissionTimerDL is started after the drx-HARQ-RTT-TimerDL times out and the UE feeds back a NACK. For an HARQ process with the HARQ function disabled, if the DRX RTT timer (drx-HARQ-RTT-TimerUL or drx-HARQ-RTT-TimerDL) corresponding to the HARQ process is no longer started, it is unable to determine when to start the DRX retransmission timer corresponding to the HARQ process.

Based on the above problem, the embodiments of the present disclosure provide a discontinuous reception method, and the discontinuous reception method according to the embodiments of the present disclosure may be applied to various communication systems, such as: Long Term Evolution (LTE) system, LTE Frequency Division Duplex (FDD) system, LTE Time Division Duplex (TDD), Universal Mobile Telecommunication System (UMTS), Worldwide Interoperability for Microwave Access (WiMAX) communication system, 5G system, NTN system or future communication system, etc.

Figure 2A:
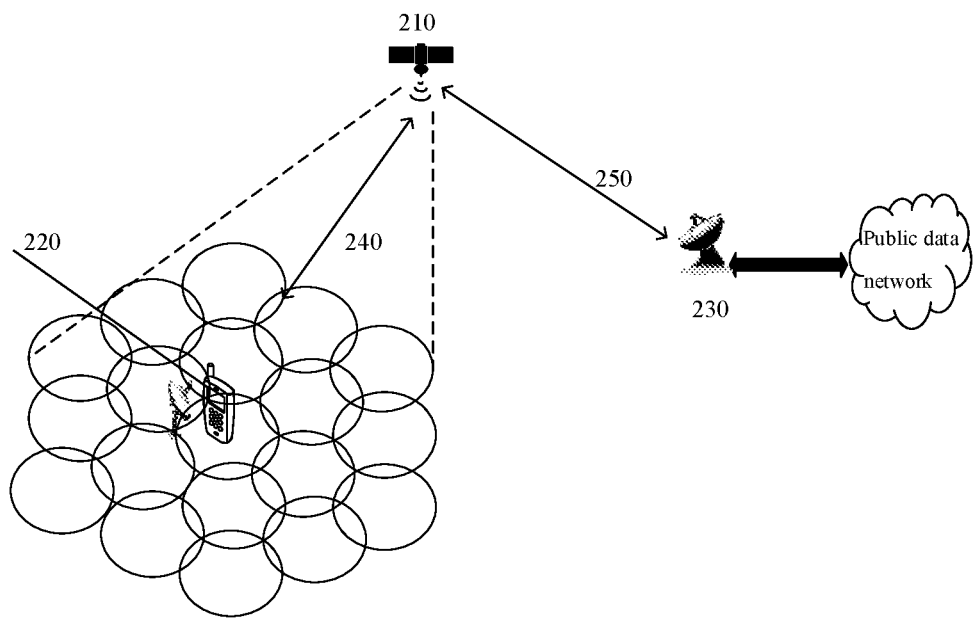
FIG. 2A is a schematic diagram of an optional composition of a communication system according to an embodiment of the present disclosure.

For example, an NTN system 200 to which the embodiments of the present disclosure is applied may be as shown in FIG. 2A. The communication system 200 may include a network device 210, and the network device 210 may be a device that communicates with a terminal device 220 (or referred to as a communication terminal, a terminal). The network device 210 may provide communication coverage for a specific geographic area, and may communicate with the terminal device(s) located within the coverage area to provide services to the terminal device(s) within the coverage area.

Optionally, the network device 210 is a communication satellite or an unmanned aircraft (Unmanned Aircraft System, UAS) platform. The communication satellites are classified into LEO communication satellites, Medium-Earth Orbit (MEO) communication satellites, GEO communication satellites, High Elliptical Orbit (HEO) communication satellites and so on according to different orbital heights. Among them, the altitude range of low-orbit communication satellites is 500 km~1500 km, and the corresponding orbital period is about 1.5 hours~2 hours. The signal propagation delay of single-hop communication (what is single-hop communication) between users is generally less than 20 ms. The maximum visible time of communication satellites is 20 minutes. The signal propagation distance is short, the link loss is small, and the transmit power requirement for user terminal is not high. For the geosynchronous orbit communication satellite, the orbit altitude is 35786 km, a rotation period around the Earth is 24 hours, and the signal propagation delay of single-hop communication between users is generally 250 ms.

In order to ensure the coverage of communication satellites and enhance the system capacity of the whole communication satellite communication system, the communication satellites use a plurality of beams to cover the ground; one communication satellite may form dozens or even hundreds of beams to cover the ground; and one communication satellite beam may cover a ground area of dozens to hundreds of kilometers in diameter.

The communication system 200 also includes at least one terminal device 220 located within the coverage of the network device 210. The "terminal device" as used herein includes, but is not limited to, an apparatus configured to receive/send communication signals for a communication satellite network; and/or an Internet of Things (IoT) device. A terminal device set to communicate via a wireless interface may be referred to as a "wireless communication terminal", a "wireless terminal", or a "mobile terminal". Examples of the mobile terminals include, but are not limited to, communication satellite phones; Personal Communications System (PCS) terminals that may combine communication satellite phones with data processing, fax, and data communication capabilities; and may include radio telephones, pagers, Internet/Intranet access, Web browsers, notepads, calendars, and/or PDA of the receiver of Global Positioning System (GPS); and conventional lap top and/or handheld receiver or other electronic apparatuses including a radio telephone transceiver. The terminal device may refer to an access terminal, user equipment (UE), a user unit, a user station, a mobile station, a mobile, a remote station, a remote terminal, a mobile device, a user terminal, a terminal, a wireless communication device, a user agent, or a user apparatus. The access terminal may refer to a cordless phone, a Session Initiation Protocol (SIP) phone, a Wireless Local Loop (WLL) station, a Personal Digital Assistant (PDA), a handheld device with wireless communication function, a computing device or other processing devices connected to a wireless modem, an in-vehicle device, a wearable device, a terminal device in 5G networks or a terminal device in future evolved PLMNs, etc.

The network device 210 communicates with the terminal device 220 through a service link or a wireless link 240. The network device 210 may communicate with a gateway 230 based on a feeder link or a wireless link 250, and is connected to the public data network through the gateway 230.

Figure 2B:
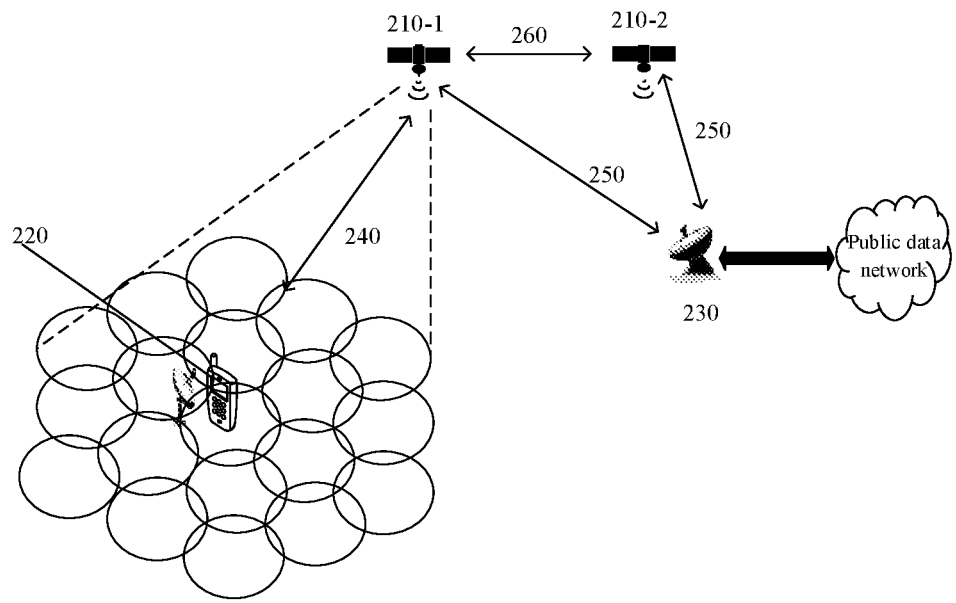
FIG. 2B is a schematic diagram of an optional composition of a communication system according to an embodiment of the present disclosure.

In an example, as shown in FIG. 2B, the network device 210 in the communication system 200 includes two network devices, i.e., a network device 210-1 and a network device 210-2, where the network device 210-1 and network device 210-2 communicate via inter-satellite links (ISL) 260, and the network device 210-1 is used for transparent transmission of payload: radio frequency filtering, frequency conversion and amplification, and the signal will not be changed through the transparent transmission of the network device 210-1. The network device 210-2 is used for regenerating the payload: radio frequency filtering, frequency conversion and amplification, along with demodulation and decoding, conversion and/or routing, encoding and modulation.

Figure 3:
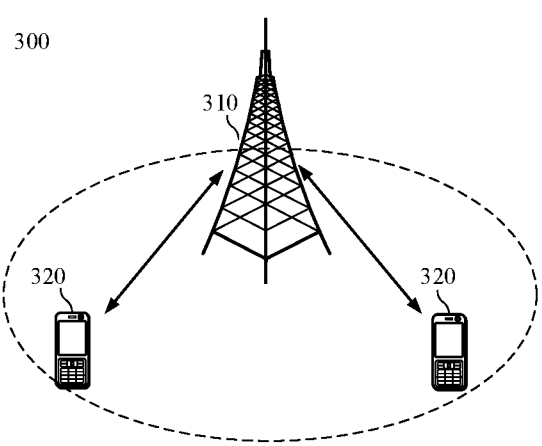
FIG. 3 is a schematic diagram of an optional composition of a communication system according to an embodiment of the present disclosure.

For example, a communication system 300 to which the embodiments of the present disclosure is applied is shown in FIG. 3. The communication system 300 may include a network device 310, and the network device 310 may be a device that communicates with a terminal device 320 (or referred to as a communication terminal, a terminal). The network device 310 may provide communication coverage for a specific geographic area, and may communicate with the terminal device(s) located within the coverage area. Optionally, the network device 310 may be an evolved base station (Evolutional Node B, eNB or eNodeB) in the LTE system, a base station (gNB) in an NR/5G system, or a wireless controller in a Cloud Radio Access Network (CRAN). Alternatively, the network device may be a mobile switching center, a relay station, an access point, an in-vehicle device, a wearable device, a hub, a switch, a bridge, a router, a network side device in a 5G network or a network device in a future evolved Public Land Mobile Network (PLMN), etc.

The communication system 300 also includes at least one terminal device 320 located within the coverage of the network device 310. Optionally, Device to Device (D2D) communication may be performed between the terminal devices 320. Optionally, the 5G system or 5G network may also be referred to as an NR system or an NR network.

FIG. 3 exemplarily shows one network device and two terminal devices. Optionally, the communication system 300 may include a plurality of network devices and other numbers of terminal devices may be included within the coverage of each network device, which is not limited by the embodiments of the present disclosure.

Optionally, the communication system 300 may also include other network entities, such as a network controller, and a mobile management entity, which is not limited by the embodiments of the present disclosure.

It should be understood that the device with a communication function in the network/system in the embodiments of the present disclosure may be referred to as a communication device. Taking the communication system 200 shown in FIG. 2A or FIG. 2B as an example, the communication device may include the network device 210 and the terminal device 220 with the communication function, and the network device 110 and the terminal device 120 may be the specific devices described above, which is not elaborated here; or, taking the communication system 300 shown in FIG. 3 as an example, the communication device may include the network device 310 and the terminal device 320 with the communication function, and the network device 310 and the terminal device 320 may be the specific devices described above, which is not elaborated here; the communication device may also include other device in the communication system, for example, other network entity such as a UAS, which is not limited in the embodiments of the present disclosure.

An optional processing flow of the discontinuous reception method provided by the embodiments of the present disclosure includes:

running, by a terminal device, a DRX uplink retransmission timer corresponding to an uplink HARQ process used for transmitting uplink data, after receiving a PDCCH indicating scheduling of transmission of the uplink data and/or after sending a PUSCH carrying the uplink data, in a case that an HARQ function of the uplink HARQ process is in a disabled state.

In the embodiments of the present disclosure, before the terminal device receives the PDCCH indicating scheduling of transmission of the uplink data or sends the PUSCH carrying the uplink data, the method further includes: receiving, by the terminal device, a configuration for the uplink HARQ process and a configuration for Configured Grant (CG) resource configured by the network device. The configuration for the uplink HARQ process may include: DRX cycle, drx-onDurationTimer, drx-InactivityTimer, drx-HARQ-RTT-TimerUL, drx-RetransmissionTimerUL, the number of uplink HARQ processes, the state of the HARQ function of each uplink HARQ process, and other parameters. The CG resources may include parameters such as the number of uplink HARQ processes reserved for the CG, and the period of the CG resources. The states of the HARQ function include an on state (enabled state) and an off state (disabled state).

Optionally, the state of the HARQ function of the uplink HARQ process is configured based on the terminal device, at this time, the states of the HARQ functions of individual uplink HARQ processes in the terminal device are the same.

Optionally, the state of the HARQ function of the uplink HARQ process is configured based on the HARQ process, at this time, the states of the HARQ functions of individual uplink HARQ processes in the terminal device are independent.

In the embodiments of the present disclosure, after receiving the PDCCH indicating scheduling of transmission of the uplink data, or before sending the PUSCH carrying the uplink data, the method further includes: determining the state of the uplink HARQ process used for sending the uplink data, when the uplink HARQ process used is in the on state, the DRX uplink retransmission timer is controlled based on a first manner, and when the uplink HARQ process used is in the off state, the DRX uplink retransmission timer is controlled based on a second manner.

In the first manner, the terminal device starts the drx-HARQ-RTT-TimerUL corresponding to the HARQ process after completing the first repeated transmission of the PUSCH, and starts the DRX uplink retransmission timer corresponding to the uplink HARQ process when the drx-HARQ-RTT-TimerUL times out.

Optionally, the terminal device sends the PUSCH on the CG resource configured by the network device. Optionally, when the terminal device sends one MAC PDU on the CG resource, the terminal device stops the DRX uplink retransmission timer corresponding to the uplink HARQ process.

Optionally, the terminal device sends the PUSCH on the resource indicated by the PDCCH sent by the network device. Optionally, when the terminal device receives the PDCCH, the terminal device stops the DRX uplink retransmission timer corresponding to the uplink HARQ process.

In the second manner, the terminal device runs the discontinuous reception uplink retransmission timer corresponding to the uplink HARQ process after receiving the PDCCH indicating scheduling of transmission of the uplink data and/or after sending the PUSCH carrying the uplink data.

Optionally, in the second manner, the terminal device does not perform the running of a discontinuous reception HARQ uplink round trip time timer corresponding to the uplink HARQ process.

Optionally, in the second manner, the resource for sending the PUSCH is the resource scheduled by the PDCCH.

At this time, initial transmission or retransmission of the uplink data is performed on the PUSCH.

In the embodiments of the present disclosure, in a case of receiving the PDCCH indicating scheduling of transmission of the uplink data, and sending the PUSCH on the resource indicated by the PDCCH, the terminal device runs the discontinuous reception uplink retransmission timer corresponding to the uplink HARQ process in one of following cases:

after receiving the PDCCH indicating scheduling of transmission of the uplink data;

after sending the PUSCH;

after receiving the PDCCH indicating scheduling of transmission of the uplink data and after sending the PUSCH.

Taking the case where the resource for sending the PUSCH is the resource scheduled by the PDCCH indicating the scheduling of transmission of the uplink data as an example, optionally, the discontinuous reception uplink retransmission timer corresponding to the uplink HARQ process is run after receiving the PDCCH indicating the scheduling of the uplink data, optionally, the discontinuous reception uplink retransmission timer corresponding to the uplink HARQ process is run after sending the PUSCH carrying the uplink data, optionally, the discontinuous reception uplink retransmission timer corresponding to the uplink HARQ process is run after receiving the PDCCH indicating scheduling of the uplink data and after sending the PUSCH carrying the uplink data.

Taking the case of running the discontinuous reception uplink retransmission timer corresponding to the uplink HARQ process after receiving the PDCCH indicating scheduling of transmission of the uplink data as an example, the running manner includes:

running manner A1: starting or restarting the discontinuous reception uplink retransmission timer at a moment when a reception of the PDCCH indicating scheduling of transmission of the uplink data is completed.

Figure 4A:
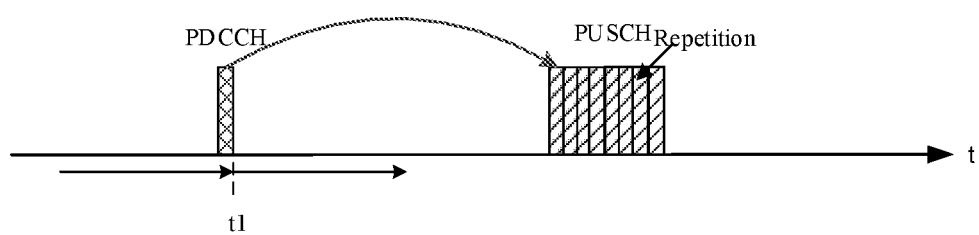
FIG. 4A is an optional timing sequence diagram of a discontinuous reception method according to an embodiment of the present disclosure.

In an example, as shown in FIG. 4A, the discontinuous reception uplink retransmission timer corresponding to the HARQ process used for uplink data transmission is started or restarted at moment t1 when the reception of the PDCCH indicating scheduling of transmission of the uplink data is completed.

Taking the case of running the discontinuous reception uplink retransmission timer corresponding to the uplink HARQ process after sending the PUSCH carrying the uplink data as an example, the running mode includes:

running manner A2: starting or restarting the DRX uplink retransmission timer in a next symbol after completing sending of the first repeated transmission of the PUSCH;

running manner A3: starting or restarting the DRX uplink retransmission timer in a next symbol after completing sending of the last repeated transmission of the PUSCH;

running manner A4: stopping the DRX uplink retransmission timer in a next symbol after completing sending of the first repeated transmission of the PUSCH, and starting or restarting the DRX uplink retransmission timer in a next symbol after completing sending of the last repeated transmission of the PUSCH.

Figure 4B:
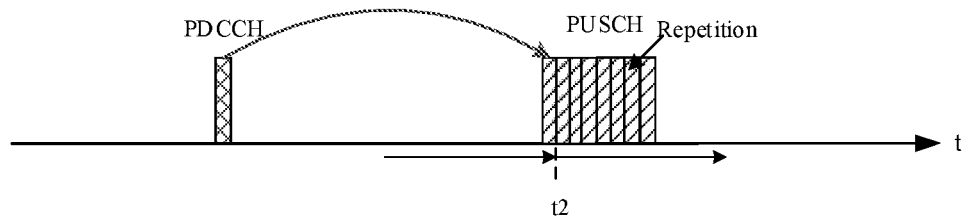
FIG. 4B is an optional timing sequence diagram of a discontinuous reception method according to an embodiment of the present disclosure.

In an example, as shown in FIG. 4B, the number of repeated transmissions of PUSCH is 8, and the discontinuous reception uplink retransmission timer corresponding to the HARQ process used for transmitting uplink data is started or restarted in the next symbol after the first repeated transmission (repetition) of PUSCH, namely moment t2.

Figure 4C:
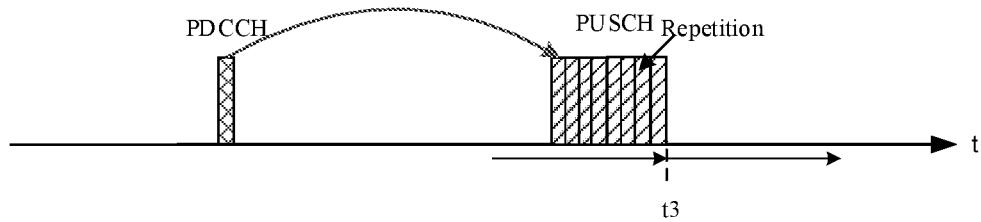
FIG. 4C is an optional timing sequence diagram of a discontinuous reception method according to an embodiment of the present disclosure.

In an example, as shown in FIG. 4C, the number of repeated transmissions of PUSCH is 8, and the discontinuous reception uplink retransmission timer corresponding to the HARQ process used for transmitting uplink data is started or restarted in the next symbol after the last repeated transmission of PUSCH, i.e., the eighth repeated transmission of PUSCH, namely moment t3.

Figure 4D:
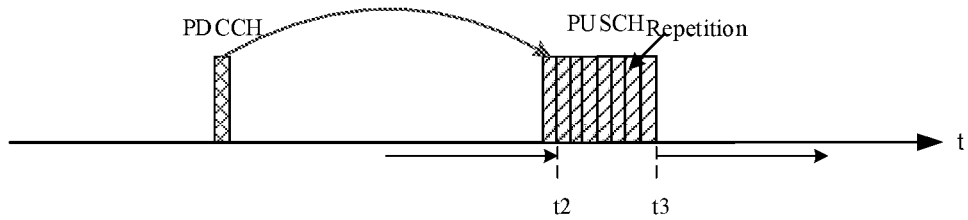
FIG. 4D is an optional timing sequence diagram of a discontinuous reception method according to an embodiment of the present disclosure.

In an example, as shown in FIG. 4D, the number of repeated transmissions of PUSCH is 8, the discontinuous reception uplink retransmission timer corresponding to the HARQ process used for transmitting uplink data is stopped in the next symbol after the first repeated transmission of PUSCH, namely moment t2, and the discontinuous reception uplink retransmission timer corresponding to the HARQ process used for transmitting uplink data is started in the next symbol after the last repeated transmission of PUSCH, i.e., the eighth repeated transmission of PUSCH, namely moment t3.

Taking the case of running the discontinuous reception uplink retransmission timer corresponding to the uplink HARQ process when receiving the PDCCH indicating scheduling of the uplink data and after sending the PUSCH carrying the uplink data as an example, the running manner includes:

running manner A5: stopping the DRX uplink retransmission timer at a moment when a reception of the PDCCH indicating scheduling of transmission of the uplink data is completed, and starting the DRX uplink retransmission timer in a next symbol after completing sending of the first repeated transmission of the PUSCH; or running manner A6: stopping the DRX uplink retransmission timer at a moment when a reception of the PDCCH indicating scheduling of transmission of the uplink data is completed, and starting the DRX uplink retransmission timer in a next symbol after completing sending of the last repeated transmission of the PUSCH.

Figure 4E:
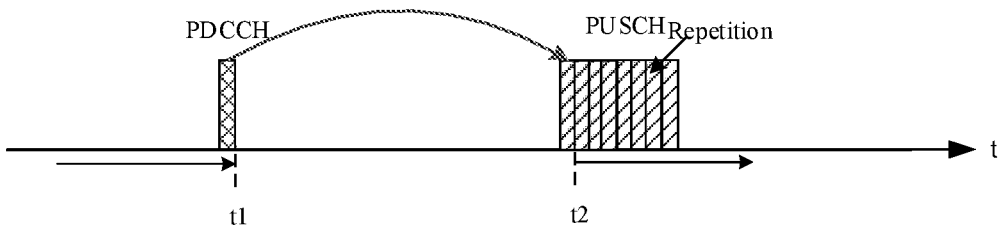
FIG. 4E is an optional timing sequence diagram of a discontinuous reception method according to an embodiment of the present disclosure.

In an example, as shown in FIG. 4E, the number of repeated transmissions of PUSCH is 8, the discontinuous reception uplink retransmission timer corresponding to the HARQ process used for transmitting uplink data is stopped at the moment t1 of receiving the PDCCH, and the discontinuous reception uplink retransmission timer is started in the next symbol after the first repeated transmission of PUSCH, namely moment t2.

Figure 4F:
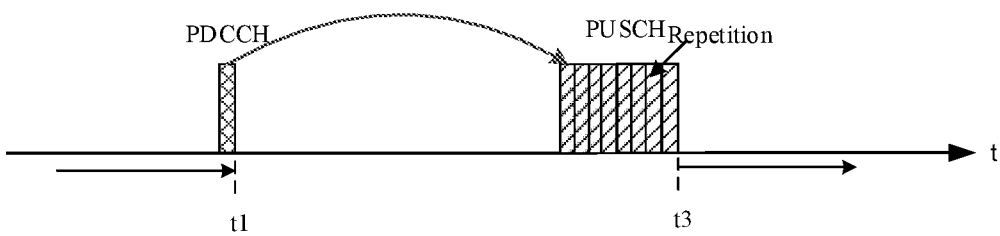
FIG. 4F is an optional timing sequence diagram of a discontinuous reception method according to an embodiment of the present disclosure.

In an example, as shown in FIG. 4F, the number of repeated transmissions of PUSCH is 8, the discontinuous reception uplink retransmission timer corresponding to the HARQ process used for transmitting uplink data is stopped at the moment t1 when the PDCCH is received, and the discontinuous reception uplink retransmission timer is started in the next symbol after the last repeated transmission of PUSCH, i.e., after the eighth repeated transmission of PUSCH, namely moment t3.

Optionally, in the second manner, the resource for sending the PUSCH is a configured grant resource configured by a network device. At this time, an initial transmission of the uplink data is performed on the PUSCH.

In the case that the PUSCH is sent on the configured grant resource configured by the network device, a discontinuous reception uplink retransmission timer corresponding to the uplink HARQ process is run after the PUSCH is sent.

Taking the case in which the resource for sending the PUSCH is the configured grant resource configured by the network device as an example, the running the discontinuous reception uplink retransmission timer corresponding to the uplink HARQ process after sending the PUSCH carrying the uplink data includes one of the following:

running manner B1: starting or restarting the DRX uplink retransmission timer in a next symbol after completing a reception of a first repeated transmission of the PUSCH;

running manner B2: starting or restarting the DRX uplink retransmission timer in a next symbol after completing a reception of a last repeated transmission of the PUSCH;

running manner B3: stopping the DRX uplink retransmission timer in a next symbol after completing a reception of a first repeated transmission of the PUSCH, and starting or restarting the DRX uplink retransmission timer in a next symbol after completing a reception of a last repeated transmission of the PUSCH.

Figure 5A:
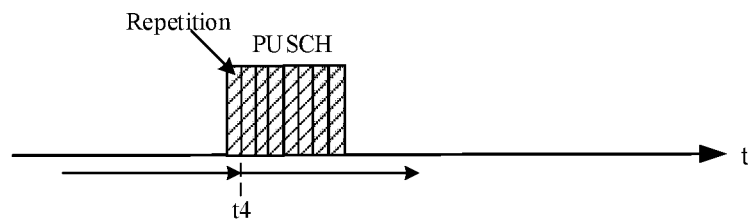
FIG. 5A is an optional timing sequence diagram of a discontinuous reception method according to an embodiment of the present disclosure.

In an example, as shown in FIG. 5A, the number of repeated transmissions of PUSCH is 8, the discontinuous reception uplink retransmission timer corresponding to the HARQ process used for transmitting uplink data is started or restarted in the next symbol after the first repeated transmission of PUSCH, namely moment t4.

Figure 5B:
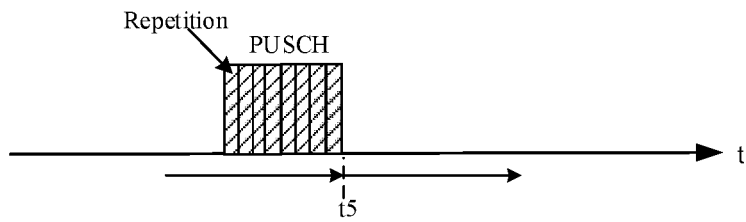
FIG. 5B is an optional timing sequence diagram of a discontinuous reception method according to an embodiment of the present disclosure.

In an example, as shown in FIG. 5B, the number of repeated transmissions of PUSCH is 8, the discontinuous reception uplink retransmission timer corresponding to the HARQ process used for transmitting uplink data is started or restarted in the next symbol after the last repeated transmission of PUSCH, i.e., the eighth repeated transmission of PUSCH, namely moment t5.

Figure 5C:
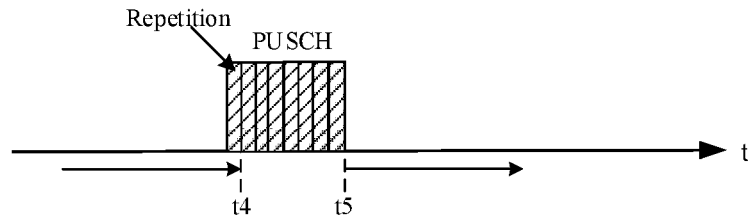
FIG. 5C is an optional timing sequence diagram of a discontinuous reception method according to an embodiment of the present disclosure.

In an example, as shown in FIG. 5C, the number of repeated transmissions of PUSCH is 8, the discontinuous reception uplink retransmission timer corresponding to the HARQ process used for transmitting uplink data is stopped in the next symbol after the first repeated transmission of PUSCH, namely moment t4, and the discontinuous reception uplink retransmission timer corresponding to the HARQ process used for transmitting uplink data is started in the next symbol after the last repeated transmission of PUSCH, i.e., the eighth repeated transmission of PUSCH, namely moment t5.

Optionally, each time the terminal device sends the PUSCH carrying the uplink data, the terminal device starts or restarts the discontinuous reception uplink retransmission timer used by the uplink HARQ used for sending the uplink data. At this time, initial transmission or retransmission of uplink data is performed on the PUSCH. Optionally, the resource for PUSCH to perform initial transmission of uplink data is the resource indicated by the PDCCH. Optionally, the resource for PUSCH to perform initial transmission of uplink data is the CG resource configured by the network device.

In an example, the terminal device performs an initial transmission of Transport Block (TB) 1 on the PUSCH at resource location 1 of the CG resource, and after sending the PUSCH at resource location 1, runs or restarts the discontinuous reception uplink retransmission timer 1 corresponding to HARQ 1 used by TB1. The terminal device receives a PDCCH indicating scheduling of retransmission of TB1, performs retransmission of TB1 on the PUSCH at resource location 2 indicated by the PDCCH, and after receiving the PDCCH indicating the scheduling of retransmission of TB1 and/or after sending the PUSCH at resource location 2, the terminal device runs the discontinuous reception uplink retransmission timer 1.

In an example, the terminal device receives a PDCCH indicating scheduling of the initial transmission of TB1, and performs the initial transmission of TB1 on the PUSCH at resource location 1 indicated by the PDCCH indicating the scheduling of the initial transmission of TB1, and after receiving the PDCCH indicating the initial transmission of TB1 and/or after sending the PUSCH at resource location 1, the terminal device starts or restarts the discontinuous reception uplink retransmission timer 1 corresponding to HARQ 1 used by TB1. The terminal device receives a PDCCH indicating the scheduling of the retransmission of TB1, and performs the retransmission of TB1 on the PUSCH at resource location 2 indicated by the PDCCH indicating the scheduling of the retransmission of TB1, and the terminal device starts or restarts the discontinuous reception uplink retransmission timer 1 after receiving the PDCCH indicating the retransmission of TB1 and/or after sending the PUSCH at resource location 2.

In a case that the PDCCH indicates scheduling of retransmission of the uplink data, the terminal device keeps running of the discontinuous reception uplink retransmission timer, after receiving the PDCCH indicating scheduling of transmission of the uplink data and/or after sending the PUSCH carrying the uplink data.

The terminal device only starts or restarts the discontinuous reception uplink retransmission timer used by the uplink HARQ used for sending the uplink data in the process of sending the initial transmission of the uplink data. In the case that the PDCCH indicates scheduling of the retransmission of the uplink data, the terminal device keeps running of the discontinuous reception uplink retransmission timer. Optionally, the resource for PUSCH carrying the uplink data of initial transmission to perform initial transmission of uplink data is the resource indicated by the PDCCH. Optionally, the resource for PUSCH carrying the uplink data of initial transmission to perform initial transmission of uplink data is the CG resource configured by the network device.

In an example, the terminal device performs an initial transmission of TB1 on the PUSCH at resource location 1 of the CG resource, and after sending the PUSCH at resource location 1, runs or restarts the discontinuous reception uplink retransmission timer corresponding to HARQ 1 used by TB1. The terminal device receives a PDCCH indicating scheduling of retransmission of TB1, performs retransmission of TB1 on the PUSCH at resource location 2 indicated by the PDCCH, and keeps the discontinuous reception uplink retransmission timer 1 running until the discontinuous reception uplink retransmission timer 1 times out.

In an example, the terminal device receives a PDCCH indicating scheduling of the initial transmission of TB1, and performs the initial transmission of TB1 on the PUSCH at resource location 1 indicated by the PDCCH indicating the scheduling of the initial transmission of TB1, and after receiving the PDCCH indicating the initial transmission of TB1 and/or after sending the PUSCH at resource location 1, the terminal device starts or restarts the discontinuous reception uplink retransmission timer 1 corresponding to HARQ 1 used by TB1. The terminal device receives a PDCCH indicating the scheduling of the retransmission of TB1, and performs the retransmission of TB1 on the PUSCH at resource location 2 indicated by the PDCCH indicating the scheduling of the retransmission of TB1, and the terminal device starts or restarts the discontinuous reception uplink retransmission timer 1 after receiving the PDCCH indicating the retransmission of TB1 and/or after sending the PUSCH at resource location 2.

In an example, the terminal device receives a PDCCH indicating the initial transmission of TB1, and performs the initial transmission of TB1 on the PUSCH at resource location 1 indicated by the PDCCH indicating the scheduling of the initial transmission of TB1, and after receiving the PDCCH indicating the initial transmission of TB1 and/or after sending the PUSCH at resource location 1, the terminal device starts or restarts the discontinuous reception uplink retransmission timer 1 corresponding to HARQ 1 used by TB1. The terminal device receives a PDCCH indicating the scheduling of the retransmission of TB1, and performs the retransmission of TB1 on the PUSCH at resource location 2 indicated by the PDCCH indicating the scheduling of the retransmission of TB1, and after receiving the PDCCH indicating the retransmission of TB1 and/or after sending the PUSCH at resource location 2, the terminal device keeps the discontinuous reception uplink retransmission timer 1 running until the discontinuous reception uplink retransmission timer 1 times out.

An optional processing flow of the discontinuous reception method provided by the embodiments of the present disclosure includes:

running, by a terminal device, a DRX downlink retransmission timer corresponding to a downlink HARQ process used for transmitting downlink data, after receiving a PDCCH indicating scheduling of transmission of the downlink data and/or after receiving a PDSCH carrying the downlink data, in a case that an HARQ function of the downlink HARQ process is in a disabled state.

In the embodiments of the present disclosure, before the terminal device receives the PDCCH indicating scheduling of transmission of the downlink data or receives the PDSCH carrying the downlink data, the method further includes: receiving, by the terminal device, a configuration for the downlink HARQ process and a configuration for downlink Semi-Persistent Scheduling (SPS) resource configured by the network device. The configuration for the downlink HARQ process may include: DRX cycle, drx-onDuration-Timer, drx-InactivityTimer, drx-HARQ-RTT-TimerDL, drx-RetransmissionTimerDL, the number of downlink HARQ processes, the state of the HARQ function of each downlink HARQ process, and other parameters. The downlink SPS resources may include parameters such as the number of downlink HARQ processes reserved for the SPS, and the period of the SPS resources. The states of the HARQ function include an on state and an off state.

Optionally, the state of the HARQ function of the downlink HARQ process is configured based on the terminal device, at this time, the states of the HARQ functions of individual downlink HARQ processes in the terminal device are the same.

Optionally, the state of the HARQ function of the downlink HARQ process is configured based on the HARQ process, at this time, the states of the HARQ functions of individual downlink HARQ processes in the terminal device are independent.

In the embodiments of the present disclosure, after the terminal device receives the PDCCH indicating scheduling of transmission of the downlink data, or before the terminal device receives the PDSCH carrying the downlink data, the method further includes: determining the state of the downlink HARQ process used for sending the downlink data, when the downlink HARQ process used is in the on state, controlling the DRX downlink retransmission timer based on a third manner, and when the downlink HARQ process used is in the off state, controlling the DRX downlink retransmission timer based on a fourth manner.

In the third manner, the terminal device starts the drx-HARQ-RTT-TimerDL corresponding to the downlink HARQ process after completing the feedback for the current downlink data transmission, where the feedback includes: ACK and NACK. When the drx-HARQ-RTT-TimerDL times out and the feedback for the current downlink data transmission is NACK, the terminal device starts the DRX uplink retransmission timer corresponding to the downlink HARQ process.

Optionally, the terminal device receives the PDSCH on the downlink SPS resource configured by the network device. Optionally, when the terminal device receives one MAC PDU on the downlink SPS resource, the terminal device stops the DRX downlink retransmission timer corresponding to the downlink HARQ process.

Optionally, the terminal device sends the PDSCH on the resource indicated by the PDCCH sent by the network device. Optionally, when the terminal device receives the PDCCH, the terminal device stops the DRX downlink retransmission timer corresponding to the downlink HARQ process.

In the fourth manner, the terminal device runs the discontinuous reception downlink retransmission timer corresponding to the downlink HARQ process after receiving the PDCCH indicating scheduling of transmission of the downlink data and/or after receiving the PDSCH carrying the downlink data.

Optionally, in the fourth manner, the terminal device does not perform the running of a discontinuous reception HARQ downlink round trip time timer corresponding to the downlink HARQ process.

Optionally, in the fourth manner, the resource for receiving the PDSCH is the resource scheduled by the PDCCH. At this time, initial transmission or retransmission of the downlink data is performed on the PDSCH.

In a case of receiving the PDCCH indicating scheduling of transmission of the downlink data, and receiving the PDSCH on the resource indicated by the PDCCH, the terminal device runs the discontinuous reception downlink retransmission timer corresponding to the downlink HARQ process in one of following cases:

after receiving the PDCCH indicating scheduling of transmission of the downlink data;

after receiving the PDSCH;

after receiving the PDCCH indicating scheduling of transmission of the downlink data and after receiving the PUSCH.

Taking the case where the resource for receiving the PUSCH is the resource scheduled by the PDCCH indicating the scheduling of transmission of the downlink data as an example, optionally, the discontinuous reception downlink retransmission timer corresponding to the downlink HARQ process is run after receiving the PDCCH indicating the scheduling of the downlink data; optionally, the discontinuous reception downlink retransmission timer corresponding to the downlink HARQ process is run after receiving the PDSCH carrying the downlink data; optionally, the discontinuous reception downlink retransmission timer corresponding to the downlink HARQ process is run after receiving the PDCCH indicating scheduling of the downlink data and after receiving the PDSCH carrying the downlink data.

Taking the case of running the discontinuous reception downlink retransmission timer corresponding to the downlink HARQ process after receiving the PDCCH indicating scheduling of transmission of the downlink data as an example, the running manner includes:

running manner C1: starting or restarting the discontinuous reception downlink retransmission timer at a moment when a reception of the PDCCH indicating scheduling of transmission of the downlink data is completed.

Figure 6A:
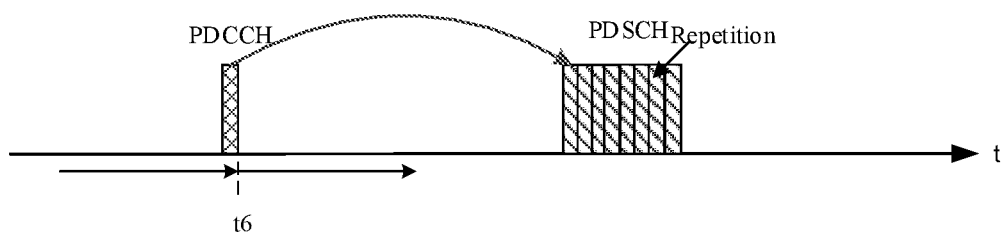
FIG. 6A is an optional timing sequence diagram of a discontinuous reception method according to an embodiment of the present disclosure.

In an example, as shown in FIG. 6A, the discontinuous reception downlink retransmission timer corresponding to the HARQ process used for downlink data transmission is started or restarted at moment t6 when the PDCCH is received.

Taking the case of running the discontinuous reception downlink retransmission timer corresponding to the downlink HARQ process after receiving the PDSCH carrying the downlink data as an example, the running manner includes:

running manner C2: starting or restarting the DRX downlink retransmission timer in a next symbol after completing receiving of a first repeated transmission of the PDSCH;

running manner C3: starting or restarting the DRX downlink retransmission timer in a next symbol after completing receiving of a last repeated transmission of the PDSCH;

running manner C4: stopping the DRX downlink retransmission timer in a next symbol after completing receiving of a first repeated transmission of the PDSCH, and starting or restarting the DRX downlink retransmission timer in a next symbol after completing receiving of a last repeated transmission of the PDSCH.

Figure 6B:
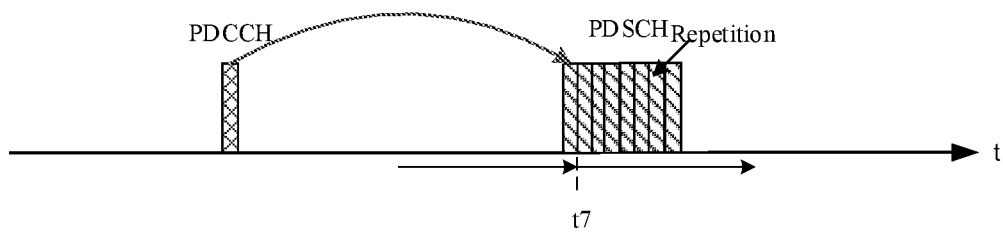
FIG. 6B is an optional timing sequence diagram of a discontinuous reception method according to an embodiment of the present disclosure.

In an example, as shown in FIG. 6B, the number of repeated transmissions of PDSCH is 8, the discontinuous reception downlink retransmission timer corresponding to the HARQ process used for transmitting downlink data is started or restarted in the next symbol after the first repeated transmission of PDSCH, namely moment t7.

Figure 6C:
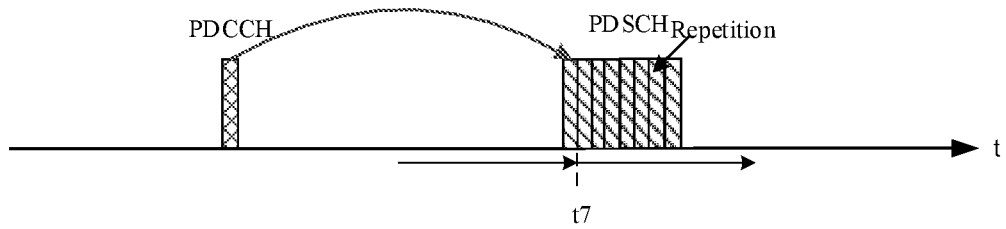
FIG. 6C is an optional timing sequence diagram of a discontinuous reception method according to an embodiment of the present disclosure.

In an example, as shown in FIG. 6C, the number of repeated transmissions of PDSCH is 8, the discontinuous reception downlink retransmission timer corresponding to the HARQ process used for transmitting downlink data is started or restarted in the next symbol after the last repeated transmission of PDSCH, i.e., the eighth repeated transmission of PDSCH, namely moment t8.

Figure 6D:
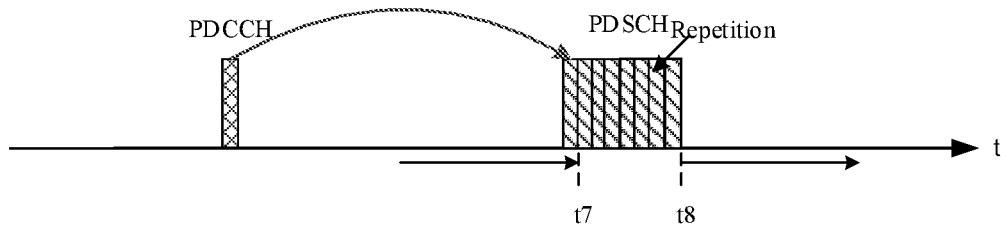
FIG. 6D is an optional timing sequence diagram of a discontinuous reception method according to an embodiment of the present disclosure.

In an example, as shown in FIG. 6D, the number of repeated transmissions of PDSCH is 8, the discontinuous reception downlink retransmission timer corresponding to the HARQ process used for transmitting downlink data is stopped in the next symbol after the first repeated transmission of PDSCH, namely moment t7, and the discontinuous reception downlink retransmission timer corresponding to the HARQ process used for transmitting downlink data is started in the next symbol after the last repeated transmission of PDSCH, i.e., the eighth repeated transmission of PDSCH, namely moment t8.

Taking the case of running the discontinuous reception downlink retransmission timer corresponding to the downlink HARQ process when receiving the PDCCH indicating scheduling of the downlink data and after receiving the PDSCH carrying the downlink data as an example, the running manner includes:

running manner C5: stopping the DRX downlink retransmission timer at a moment when a reception of the PDCCH indicating scheduling of transmission of the downlink data is completed, and starting the DRX downlink retransmission timer in a next symbol after completing receiving of a first repeated transmission of the PDSCH; or running manner C6: stopping the DRX downlink retransmission timer at a moment when a reception of the PDCCH indicating scheduling of transmission of the downlink data is completed, and starting the DRX downlink retransmission timer in a next symbol after completing receiving of a last repeated transmission of the PDSCH.

Figure 6E:
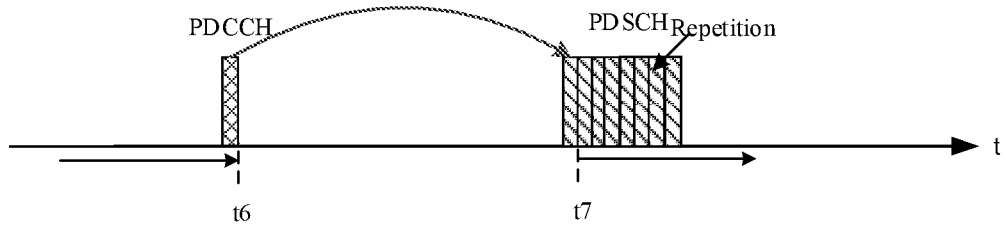
FIG. 6E is an optional timing sequence diagram of a discontinuous reception method according to an embodiment of the present disclosure.

In an example, as shown in FIG. 6E, the number of repeated transmissions of PDSCH is 8, the discontinuous reception downlink retransmission timer corresponding to the HARQ process used for transmitting downlink data is stopped at the moment t6 when the PDCCH is received, and the discontinuous reception downlink retransmission timer is started in the next symbol after the first repeated transmission of PDSCH, namely moment t7.

Figure 6F:
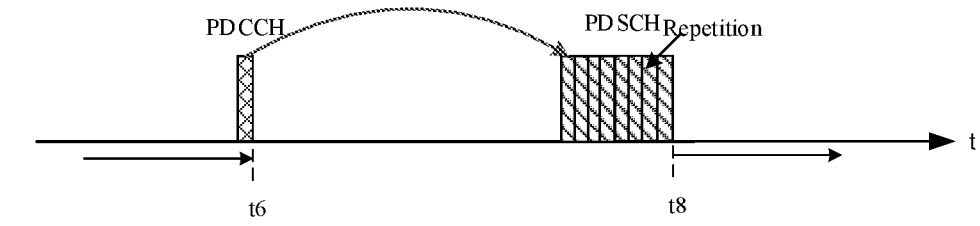
FIG. 6F is an optional timing sequence diagram of a discontinuous reception method according to an embodiment of the present disclosure.

In an example, as shown in FIG. 6F, the number of repeated transmissions of PDSCH is 8, the discontinuous reception downlink retransmission timer corresponding to the HARQ process used for transmitting downlink data is stopped at the moment t6 when the PDCCH is received, and the discontinuous reception downlink retransmission timer is started in the next symbol after the last repeated transmission of PDSCH, i.e., the eighth repeated transmission of PDSCH, namely moment t8.

Optionally, in the fourth manner, the resource for receiving the PDSCH is a downlink semi-persistent scheduling resource configured by a network device. At this time, an initial transmission of the downlink data is received on the PDSCH.

In the case that the PDSCH is received on the downlink semi-persistent scheduling resource configured by the network device, a discontinuous reception downlink retransmission timer corresponding to the downlink HARQ process is run after the PDSCH is received.

Taking the case in which the resource for receiving the PDSCH is the downlink semi-persistent scheduling resource configured by the network device as an example, the running the discontinuous reception downlink retransmission timer corresponding to the downlink HARQ process after receiving the PDSCH carrying the downlink data includes one of the following:

running manner D1: starting or restarting the DRX downlink retransmission timer in a next symbol after completing a reception of a first repeated transmission of the PDSCH;

running manner D2: starting or restarting the DRX downlink retransmission timer in a next symbol after completing a reception of a last repeated transmission of the PDSCH;

running manner D3: stopping the DRX downlink retransmission timer in a next symbol after completing a reception of a first repeated transmission of the PDSCH, and starting or restarting the DRX downlink retransmission timer in a next symbol after completing a reception of a last repeated transmission of the PDSCH.

Figure 7A:
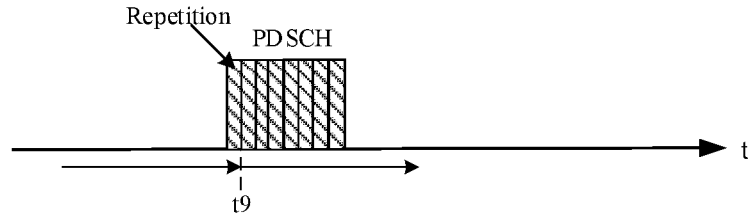
FIG. 7A is an optional timing sequence diagram of a discontinuous reception method according to an embodiment of the present disclosure.

In an example, as shown in FIG. 7A, the number of repeated transmissions of PDSCH is 8, the discontinuous reception downlink retransmission timer corresponding to the HARQ process used for transmitting downlink data is started or restarted in the next symbol after the first repeated transmission of PDSCH, namely moment t9.

Figure 7B:
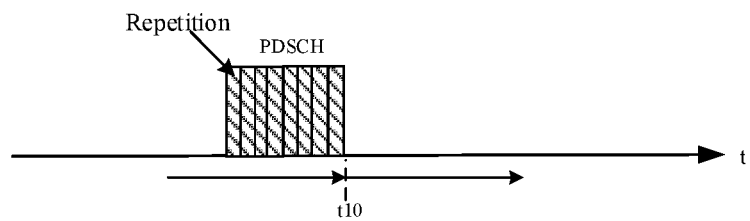
FIG. 7B is an optional timing sequence diagram of a discontinuous reception method according to an embodiment of the present disclosure.

In an example, as shown in FIG. 7B, the number of repeated transmissions of PDSCH is 8, the discontinuous reception downlink retransmission timer corresponding to the HARQ process used for transmitting downlink data is started or restarted in the next symbol after the last repeated transmission of PUSCH, i.e., the eighth repeated transmission of PUSCH, namely moment t10.

Figure 7C:
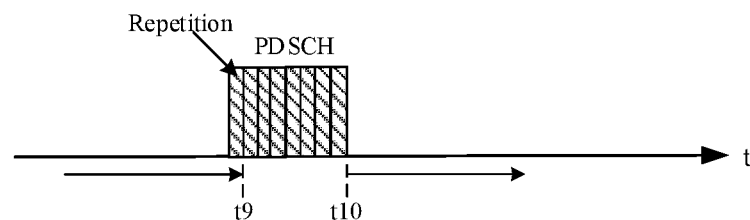
FIG. 7C is an optional timing sequence diagram of a discontinuous reception method according to an embodiment of the present disclosure.

In an example, as shown in FIG. 7C, the number of repeated transmissions of PDSCH is 8, the discontinuous reception downlink retransmission timer corresponding to the HARQ process used for transmitting downlink data is stopped in the next symbol after the first repeated transmission of PDSCH, namely moment t9, and the discontinuous reception downlink retransmission timer corresponding to the HARQ process used for transmitting downlink data is started in the next symbol after the last repeated transmission of PDSCH, i.e., the eighth repeated transmission of PDSCH, namely moment t10.

Optionally, each time the terminal device receives the PDSCH carrying the downlink data, the terminal device starts or restarts the discontinuous reception downlink retransmission timer used by the downlink HARQ used for receiving the downlink data. At this time, initial transmission or retransmission of downlink data is performed on the PDSCH. Optionally, the resource for PDSCH to perform initial transmission of downlink data is the resource indicated by the PDCCH. Optionally, the resource for PDSCH to perform initial transmission of downlink data is the semi-persistent scheduling resource configured by the network device.

In an example, the terminal device receives an initial transmission of TB2 through the PDSCH at resource location 3 of the SPS resource, and after receiving the PDSCH at resource location 3, the terminal device runs or restarts the discontinuous reception downlink retransmission timer 2 corresponding to HARQ 2 used by TB2. The terminal device receives a PDCCH indicating scheduling of retransmission of TB2, receives retransmission of TB2 on the PDSCH at resource location 4 indicated by the PDCCH, and the terminal device starts or restarts the discontinuous reception downlink retransmission timer 2 after receiving the PDCCH indicating the scheduling of retransmission of TB2 and/or after receiving the PDSCH at resource location 4.

In an example, the terminal device receives a PDCCH indicating scheduling of the initial transmission of TB2, and receives the initial transmission of TB2 on the PDSCH at resource location 3 indicated by the PDCCH indicating the scheduling of the initial transmission of TB2, and after receiving the PDCCH indicating the initial transmission of TB2 and/or after receiving the PDSCH at resource location 3, the terminal device starts or restarts the discontinuous reception downlink retransmission timer 2 corresponding to HARQ 2 used by TB3. The terminal device receives a PDCCH indicating the scheduling of the retransmission of TB2, and receives the retransmission of TB2 through the PDSCH at resource location 4 indicated by the PDCCH indicating the scheduling of the retransmission of TB2, and the terminal device starts or restarts the discontinuous reception downlink retransmission timer 2 after receiving the PDCCH indicating the retransmission of TB2 and/or after receiving the PDSCH at resource location 4.

Optionally, in a case of receiving retransmission of the downlink data on the PDSCH, the terminal device keeps the discontinuous reception downlink retransmission timer running, after receiving the PDCCH indicating scheduling of transmission of the downlink data and/or after receiving the PDSCH carrying the downlink data.

The terminal device only starts or restarts the discontinuous reception downlink retransmission timer used by the downlink HARQ used for receiving the downlink data in the process of receiving the initial transmission of the downlink data on the PDSCH. In the case that retransmission of the downlink data is performed on the PDSCH, the terminal device keeps the discontinuous reception downlink retransmission timer running. Optionally, the resource for PDSCH to perform initial transmission of downlink data is the resource indicated by the PDCCH. Optionally, the resource for PDSCH to perform initial transmission of downlink data is the semi-persistent scheduling resource configured by the network device.

In an example, the terminal device receives an initial transmission of TB2 through the PDSCH at resource location 3 of the SPS resource, and after receiving the PDSCH at resource location 3, the terminal device runs or restarts the discontinuous reception downlink retransmission timer corresponding to HARQ 2 used by TB2. The terminal device receives a PDCCH indicating scheduling of retransmission of TB2, receives retransmission of TB2 on the PDSCH at resource location 4 indicated by the PDCCH, and after receiving the PDCCH indicating the retransmission of TB2 and/or after receiving the PDSCH at resource location 4, the terminal device keeps the discontinuous reception downlink retransmission timer 2 running until the discontinuous reception downlink retransmission timer 2 times out.

In an example, the terminal device receives a PDCCH indicating scheduling of the initial transmission of TB2, and receives the initial transmission of TB2 through the PDSCH at resource location 3 indicated by the PDCCH indicating the scheduling of the initial transmission of TB2, and starts or restarts the discontinuous reception downlink retransmission timer 2 corresponding to HARQ 2 used by TB2 after receiving the PDCCH indicating the initial transmission of TB2 and/or after receiving the PDSCH at resource location 3. The terminal device receives a PDCCH indicating the scheduling of the retransmission of TB2, and receives the retransmission of TB2 on the PDSCH at resource location 4 indicated by the PDCCH indicating the scheduling of the retransmission of TB2, and after receiving the PDCCH indicating the retransmission of TB2 and/or after receiving the PDSCH at resource location 4, the terminal device keeps the discontinuous reception downlink retransmission timer 2 running until the discontinuous reception downlink retransmission timer 2 times out.

Optionally, after the terminal device receives the downlink data carried by the PDSCH, the terminal device decodes the downlink data carried by the PDSCH; in a case of correct decoding, the terminal device stops the discontinuous reception downlink retransmission timer.

Optionally, in a case of decoding failure, the terminal device keeps the discontinuous reception downlink retransmission timer running.

In the embodiments of the present disclosure, the terminal device may receive the PDCCH during the active period of the DRX cycle or the running period of the DRX inactive timer. In the inactive period of the DRX cycle and the period in which the DRX inactive timer is not running, the terminal device does not monitor the PDCCH and cannot receive the PDCCH sent by the network device. Optionally, the DRX cycle is a long DRX cycle, and optionally, the DRX cycle is a short DRX cycle.

In the embodiments of the present disclosure, in the case that the HARQ function of the HARQ process used for data transmission is in a disabled state, after receiving the PDCCH indicating scheduling of data transmission and/or after performing data transmission, the retransmission timer of the discontinuous reception performed by the HARQ process is run.

Taking the case of performing uplink data transmission as an example, in a case that the HARQ function of the uplink HARQ process is in a disabled state, the terminal device runs a DRX uplink retransmission timer corresponding to the uplink HARQ process used for transmitting uplink data, after receiving a PDCCH indicating scheduling of transmission of the uplink data and/or after sending a PUSCH carrying the uplink data.

Taking the case of performing downlink data transmission as an example, in a case that the HARQ function of the downlink HARQ process is in a disabled state, the terminal device runs a DRX downlink retransmission timer corresponding to the downlink HARQ process used for transmitting downlink data, after receiving a PDCCH indicating scheduling of transmission of the downlink data and/or after receiving a PDSCH carrying the downlink data.

The discontinuous reception method provided by the embodiments of the present disclosure controls the discontinuous reception retransmission timer corresponding to the HARQ process used for data transmission based on the PDCCH indicating the scheduling of data transmission and the transmission of data, and monitors the transmitted data. In this way, the data transmission continuity is ensured without increasing the number of HARQ processes in the case that the HARQ function of the HARQ process of the terminal device is disabled.

In the following, taking a case that the network device is a communication satellite and the terminal device is a UE as an example, the discontinuous reception method provided by the embodiments of the present disclosure is illustrated by using different examples.

In a first example, for a downlink HARQ process with the HARQ function disabled, the UE starts or restarts the DRX downlink retransmission timer corresponding to the downlink HARQ process during each downlink transmission (including initial transmission and retransmission).

In step S501, the UE receives the following RRC configuration information configured by the network device:
a) DRX related configuration, including: DRX cycle, drx-onDurationTimer, drx-InactivityTimer, drx-HARQ-RTT-TimerDL, drx-RetransmissionTimerDL, etc.;
b) downlink HARQ process configuration parameters, including: the number of downlink HARQ processes, the state of the HARQ function of each downlink HARQ process (whether the HARQ function is enabled or the HARQ function is disabled);
c) for each serving cell of the UE, configuring at least one DL Bandwidth part (BWP), optionally, for each DL BWP in the configured at least one DL BWP, configuring a DL SPS for the DL BWP;
d) DL SPS configuration parameters, including: Configured Scheduling RNTI (CS-RNTI), the number of HARQ processes reserved for SPS, and the SPS resource period, etc.

In step S502, when the UE receives the PDCCH indicating scheduling of downlink initial transmission or retransmission, the UE determines the state of the HARQ function of the downlink HARQ process used in current downlink transmission:
a) if the HARQ function of the downlink HARQ process is in the enabled state, performing step S503;
b) if the HARQ function of the downlink HARQ process is in the disabled state, performing step S504.

In step S503, the UE performs control of drx-RetransmissionTimerDL based on the received PDCCH and the HARQ function in the enabled state.

The PDCCH sent by the network device is received when drx-onDurationTimer is running or drx-InactivityTimer is running.

In step S5031, when the UE receives the PDCCH, the UE stops the drx-RetransmissionTimerDL corresponding to the downlink HARQ process.

In step S5032, the UE starts the drx-HARQ-RTT-TimerDL corresponding to the downlink HARQ process after completing the transmission of the ACK/NCAK feedback for current downlink transmission.

In step S5033, if the drx-HARQ-RTT-TimerDL corresponding to the downlink HARQ process times out and the UE feeds back NACK for current downlink transmission, the UE starts the drx-RetransmissionTimerDL corresponding to the downlink HARQ process.

In step S504, the UE performs control of drx-RetransmissionTimerDL based on the received PDCCH and the HARQ function in the disabled state.

In step S5041, the UE stops/starts/restarts the drx-RetransmissionTimerDL corresponding to the downlink HARQ process when receiving the current downlink transmission. The moment when the UE stops/starts/restarts the drx-RetransmissionTimerDL corresponding to the downlink HARQ process includes the following six schemes.

Scheme 1: as shown in FIG. 6A, the UE starts or restarts the drx-RetransmissionTimerDL corresponding to the downlink HARQ process at the moment when the PDCCH is received.

Scheme 2: as shown in FIG. 6E, the UE stops the drx-RetransmissionTimerDL corresponding to the downlink HARQ process at the moment when the PDCCH is received. The UE starts the drx-RetransmissionTimerDL corresponding to the downlink HARQ process in the next symbol after completing the reception of the first repeated transmission of the PDSCH.

Scheme 3: as shown in FIG. 6F, the UE stops the drx-RetransmissionTimerDL corresponding to the downlink HARQ process at the moment when the PDCCH is received. The UE starts the drx-RetransmissionTimerDL corresponding to the downlink HARQ process in the next symbol after completing the reception of the last repeated transmission of the PDSCH.

Scheme 4: as shown in FIG. 6B, the UE starts or restarts the drx-RetransmissionTimerDL corresponding to the downlink HARQ process in the next symbol after completing the reception of the first repeated transmission of the PDSCH.

Scheme 5: as shown in FIG. 6D, the UE stops the drx-RetransmissionTimerDL corresponding to the downlink HARQ process at the moment when the reception of the first repeated transmission of the PDSCH is completed, and starts the drx-RetransmissionTimerDL corresponding to the downlink HARQ process in the next time symbol after completing the reception of the last repeated transmission of the PDSCH.

Scheme 6: as shown in FIG. 6C, the UE starts or restarts the drx-RetransmissionTimerDL corresponding to the downlink HARQ process in the next time symbol after completing the reception of the last repeated transmission of the PDSCH.

In step S5042, the UE attempts to decode the data transmitted by the PDSCH. If the UE decodes the data correctly, the UE stops the drx-RetransmissionTimerDL corresponding to the HARQ process used by the PDSCH transmission.

In step S505, the UE receives the downlink initial transmission on the downlink grant resource, and the UE determines the state of the HARQ function of the downlink HARQ process used in current downlink transmission:
  a) if the HARQ function of the downlink HARQ process is in the enabled state, performing step S506;
  b) if the HARQ function of the downlink HARQ process is in the disabled state, performing step S507.

In step S506, the UE performs control of drx-RetransmissionTimerDL based on the received downlink initial transmission and the HARQ function in the enabled state.

In step S5061, when the UE receives one MAC PDU on the configured downlink grant resource, the UE stops the drx-RetransmissionTimerDL corresponding to the downlink HARQ process.

In step S5062, the UE starts the drx-HARQ-RTT-TimerDL corresponding to the downlink HARQ process after completing the transmission of the ACK/NCAK feedback for current downlink transmission.

In step S5063, if the drx-HARQ-RTT-TimerDL corresponding to the downlink HARQ process times out and the UE feeds back NACK for current downlink transmission, the UE starts the drx-RetransmissionTimerDL corresponding to the downlink HARQ process.

In step S507, the UE performs control of drx-RetransmissionTimerDL based on the received downlink initial transmission and the HARQ function in the disabled state.

In step S5071, the UE receives the downlink initial transmission on the downlink grant resource, then the UE starts or restarts the drx-RetransmissionTimerDL corresponding to the downlink HARQ process. For the specific moment of stopping and/or starting of drx-RetransmissionTimerDL, there are the following three schemes.

Scheme 1: as shown in FIG. 7A, the UE starts or restarts the drx-RetransmissionTimerDL corresponding to the downlink HARQ process in the next symbol after completing the reception of the first repeated transmission of the PDSCH.

Scheme 2: as shown in FIG. 7B, the UE starts or restarts the drx-RetransmissionTimerDL corresponding to the downlink HARQ process in the next symbol after completing the reception of the last repeated transmission of the PDSCH.

Scheme 3: as shown in FIG. 7C, the UE stops the drx-RetransmissionTimerDL corresponding to the downlink HARQ process at the moment when the reception of the first repeated transmission of the PDSCH is completed, and starts the drx-RetransmissionTimerDL corresponding to the downlink HARQ process in the next symbol after completing the reception of the last repeated transmission of the PDSCH.

In step S5072, the UE receives the PDSCH and attempts to decode it, and if the UE decodes correctly, the UE stops the drx-RetransmissionTimerDL corresponding to the downlink HARQ process used by the PDSCH transmission.

In an example, the UE receives the following RRC configuration information of the network device: DRX-related parameters including DRX cycle, drx-onDurationTimer, drx-InactivityTimer, drx-HARQ-RTT-TimerDL, drx-RetransmissionTimerDL, etc.; configuring 2 downlink HARQ processes for the UE, namely HARQ ID 0 and HARQ ID 1, where the HARQ functions of the two downlink HARQ processes are disabled; for the UE's serving cell, configuring one DL BWP, and configuring DL SPS for the DL BWP, where the downlink HARQ used by the DL SPS is HARQ ID 0.

Figure 8:
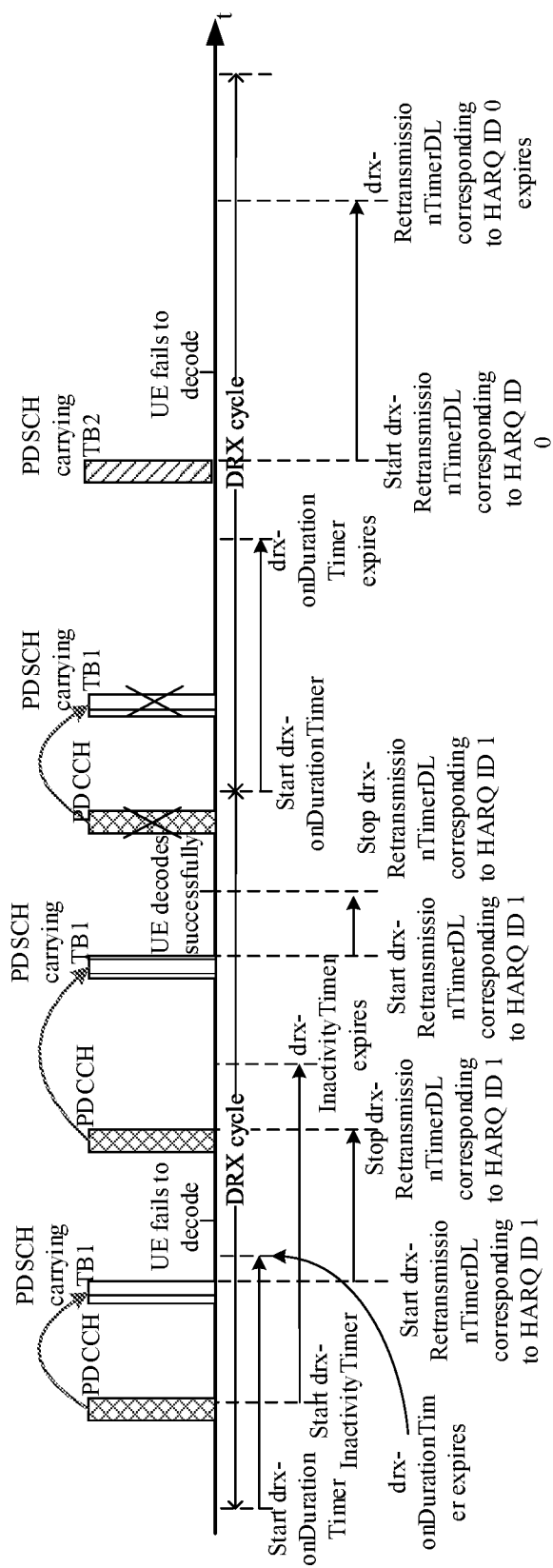
FIG. 8 is an optional timing sequence diagram of a discontinuous reception method according to an embodiment of the present disclosure.

As shown in FIG. 8, when the drx-onDurationTimer or drx-InactivityTimer is running, the UE receives the PDCCH sent by the network device, the received PDCCH indicates the initial transmission of TB1, and the HARQ used to transmit TB1 is HARQ ID 1. The UE receives PDSCH on the resource indicated by the PDCCH, and after completing the PDSCH reception, the UE starts the drx-RetransmissionTimerDL corresponding to HARQ ID 1. The UE fails to decode the initial transmission of TB1, and the UE continues to run the drx-RetransmissionTimerDL corresponding to HARQ ID 1. The UE receives the PDCCH indicating retransmission of TB1, and stops the drx-RetransmissionTimerDL corresponding to HARQ ID 1 after the UE completes the reception of the PDCCH. The UE receives the PDSCH on the resource indicated by the PDCCH indicating the retransmission of TB1, and the UE starts the drx-RetransmissionTimerDL corresponding to HARQ ID 1 after completing the reception of the PDSCH. The UE successfully decodes the retransmission of TB1, and the UE stops the drx-RetransmissionTimerDL corresponding to the HARQ ID 1. After that, the network device schedules the second retransmission of TB1, since drx-onDurationTimer, drx-InactivityTimer and drx-RetransmissionTimerDL are not running at this time, and the UE is in the DRX sleeping state, the UE does not detect the PDCCH indicating the scheduling of second retransmission of TB1, nor does it receive the corresponding PDSCH.

As shown in FIG. 8, the UE receives the initial transmission of TB2 on the downlink SPS resource, and downlink HARQ ID 0 is used for this transmission. The UE starts the drx-RetransmissionTimerDL corresponding to HARQ ID 0 after completing the PDSCH reception. The UE fails to decode the initial transmission of TB2, and the UE continues to run the drx-RetransmissionTimerDL corresponding to HARQ ID 0 until the drx-RetransmissionTimerDL times out.

It should be noted that, in FIG. 8, the discontinuous reception method provided by the embodiments of the present application is described by taking the case in which the drx-RetransmissionTimerDL is started after the reception of PDSCH and the drx-RetransmissionTimerDL is stopped after the reception of PDCCH or after successful decoding as an example. The control of the drx-RetransmissionTimerDL in the embodiment of the present disclosure may also adopt other control manners for the drx-RetransmissionTimerDL provided in the embodiments of the present disclosure.

In a second example, for a downlink HARQ process with the HARQ function disabled, the UE only starts or restarts the discontinuous reception downlink retransmission timer corresponding to the HARQ process during downlink initial transmission.

In step S601, the UE receives the following RRC configuration information configured by the network device:
  a) DRX related configuration, including: DRX cycle, drx-onDurationTimer, drx-InactivityTimer, drx-HARQ-RTT-TimerDL, drx-RetransmissionTimerDL, etc.;
  b) downlink HARQ process configuration parameters, including: the number of downlink HARQ processes, the state of the HARQ function of each downlink HARQ process (whether the HARQ function is enabled or the HARQ function is disabled);

c) for each serving cell of the UE, configuring at least one DL Bandwidth part (BWP), optionally, for each DL BWP in the configured at least one DL BWP, configuring a DL SPS for the DL BWP;

d) DL SPS configuration parameters, including: CS-RNTI, the number of HARQ processes reserved for SPS, and the SPS resource period, etc.

In step S602, when the UE receives the PDCCH indicating scheduling of downlink initial transmission, the UE determines the state of the HARQ function of the downlink HARQ process used in current downlink transmission:

a) if the HARQ function of the downlink HARQ process is in the enabled state, performing step S603;

b), if the HARQ function of the downlink HARQ process is in the disabled state, performing step S604.

In step S603, the UE performs drx-RetransmissionTimerDL control based on the received PDCCH and the HARQ function in the enabled state.

In step S6031, when the UE receives the PDCCH, the UE stops the drx-RetransmissionTimerDL corresponding to the downlink HARQ process.

In step S6032, the UE starts the drx-HARQ-RTT-TimerDL corresponding to the downlink HARQ process after completing the transmission of the ACK/NCAK feedback for current downlink transmission.

In step S6033, if the drx-HARQ-RTT-TimerDL corresponding to the downlink HARQ process times out and the UE feeds back NACK for current downlink transmission, the UE starts the drx-RetransmissionTimerDL corresponding to the downlink HARQ process.

In step S604, the UE performs drx-RetransmissionTimerDL control based on the received PDCCH and the HARQ function in the disabled state.

In step S6041, the UE stops/starts/restarts the drx-RetransmissionTimerDL corresponding to the downlink HARQ process when receiving the current downlink transmission. The schemes for the moment when the UE stops/starts/restarts the drx-RetransmissionTimerDL corresponding to the downlink HARQ process are the same as the schemes described in step S5041, and will not be repeated here.

In step S6042, the UE attempts to decode the data transmitted by the PDSCH. If the UE decodes the data correctly, the UE stops the drx-RetransmissionTimerDL corresponding to the HARQ process used by the PDSCH transmission.

In step S605, the UE receives the downlink initial transmission on the downlink grant resource, and the UE determines the state of the HARQ function of the downlink HARQ process used in current downlink transmission:

a) if the HARQ function of the downlink HARQ process is in the enabled state, performing step S606;

b) if the HARQ function of the downlink HARQ process is in the disabled state, performing step S607.

In step S606, the UE performs control of drx-RetransmissionTimerDL based on the received downlink initial transmission and the HARQ function in the enabled state.

In step S6061, when the UE receives one MAC PDU on the configured downlink grant resource, the UE stops the drx-RetransmissionTimerDL corresponding to the downlink HARQ process.

In step S6062, the UE starts the drx-HARQ-RTT-TimerDL corresponding to the downlink HARQ process after completing the transmission of the ACK/NCAK feedback for current downlink transmission.

In step S6063, if the drx-HARQ-RTT-TimerDL corresponding to the downlink HARQ process times out and the UE feeds back NACK for current downlink transmission, the UE starts the drx-RetransmissionTimerDL corresponding to the downlink HARQ process.

In step S607, the UE performs control of drx-RetransmissionTimerDL based on the received downlink initial transmission and the HARQ function in the disabled state.

In step S6071, the UE receives the downlink initial transmission on the downlink grant resource, and the UE starts or restarts the drx-RetransmissionTimerDL corresponding to the downlink HARQ process. The schemes for the moment when the UE stops and/or starts the drx-RetransmissionTimerDL are the same as the schemes described in step S5071, and will not be repeated here.

In step S6072, the UE receives the PDSCH and attempts to decode it, and if the UE decodes correctly, the UE stops the drx-RetransmissionTimerDL corresponding to the downlink HARQ process used by the PDSCH transmission.

In an example, the UE receives the following RRC configuration information of the network device: DRX-related parameters including DRX cycle, drx-onDurationTimer, drx-InactivityTimer, drx-HARQ-RTT-TimerDL, drx-RetransmissionTimerDL, etc.; configuring 2 downlink HARQ processes for the UE, namely HARQ ID 0 and HARQ ID 1, where the HARQ functions of the two downlink HARQ processes are both in the disabled state; for the UE's serving cell, configuring one DL BWP, and configuring DL SPS for the DL BWP, where the downlink HARQ used by the DL SPS is HARQ ID 0.

Figure 9:
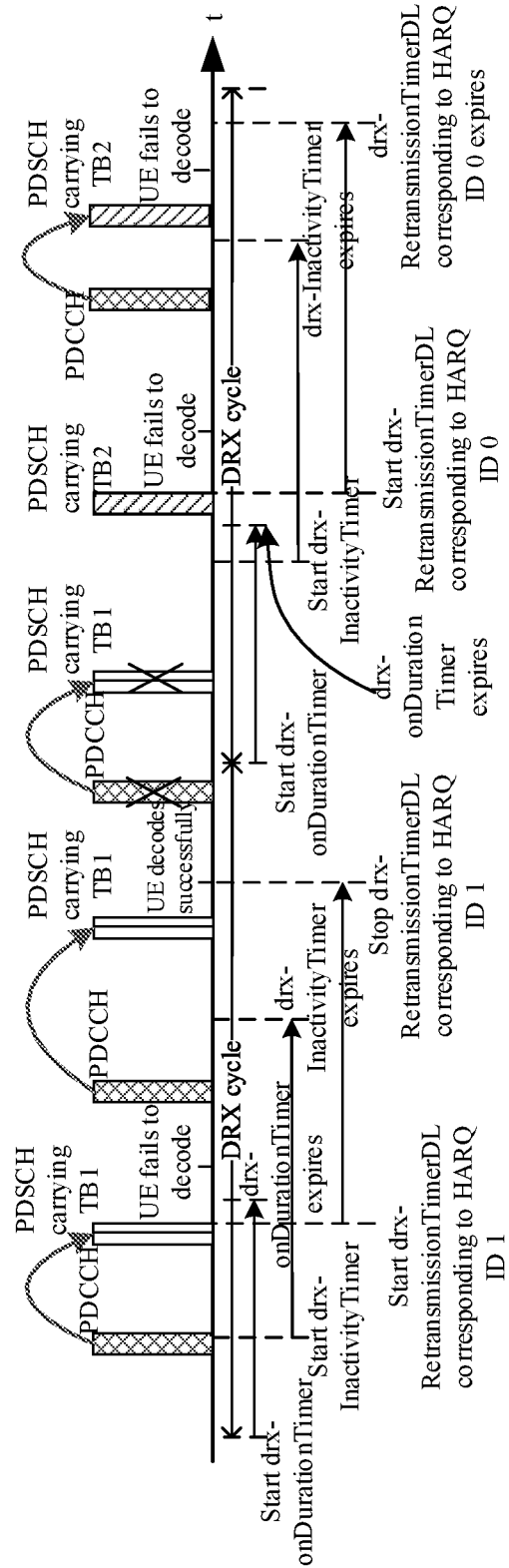
FIG. 9 is an optional timing sequence diagram of a discontinuous reception method according to an embodiment of the present disclosure.

As shown in FIG. 9, when the drx-onDurationTimer or drx-InactivityTimer is running, the UE receives the PDCCH sent by the network device, the received PDCCH indicates the initial transmission of TB1, and the HARQ used is HARQ ID 1. The UE receives PDSCH on the resource indicated by the PDCCH, and after completing the PDSCH reception, the UE starts the drx-RetransmissionTimerDL corresponding to HARQ ID 1. The UE fails to decode the initial transmission of TB1, and the UE continues to run the drx-RetransmissionTimerDL corresponding to HARQ ID 1. The UE receives the PDCCH indicating retransmission of TB1, the UE receives the PDSCH on the resource indicated by the PDCCH indicating the retransmission of TB1, and the UE continuous to run the drx-RetransmissionTimerDL corresponding to HARQ ID 1. The UE successfully decodes the initial transmission of TB1, and the UE stops the drx-RetransmissionTimerDL corresponding to the HARQ ID 1. After that, the network device schedules the second retransmission of TB1, since drx-onDurationTimer, drx-InactivityTimer and drx-RetransmissionTimerDL are not running at this time, the UE is in the DRX sleeping state, and the UE does not detect the PDCCH indicating the scheduling of second retransmission of TB1, nor does it receive the corresponding PDSCH.

As shown in FIG. 9, the UE receives the initial transmission of TB2 on the downlink grant resource, and the downlink HARQ ID 0 is used for this transmission. The UE starts the drx-RetransmissionTimerDL corresponding to HARQ ID 0 after completing the PDSCH reception. The UE fails to decode the initial transmission of TB2, and the UE continues to run the drx-RetransmissionTimerDL corresponding to HARQ ID 0. The UE receives PDCCH indicating the retransmission of TB2, the UE receives the PDSCH on the resource indicated by the PDCCH, and continues to run the drx-RetransmissionTimerDL corresponding to the HARQ ID 0. The UE fails to decode the TB2 retransmission, and the UE continues to run the drx-RetransmissionTimerDL corresponding to HARQ ID 0 until the drx-RetransmissionTimerDL times out.

It should be noted that, in FIG. 9, the multi-discontinuous reception method provided by the embodiments of the present application is described by taking the case in which the drx-RetransmissionTimerDL is started after the reception of PDSCH carrying the initially transmitted downlink data and the drx-RetransmissionTimerDL is stopped after the received downlink data is successfully decoded. The control of the drx-RetransmissionTimerDL in the embodiment of the present disclosure may also adopt other control manners for the drx-RetransmissionTimerDL provided in the embodiments of the present disclosure.

In a third example, for an uplink HARQ process with the HARQ function disabled, the UE starts or restarts the DRX uplink retransmission timer corresponding to the uplink HARQ process during each uplink transmission (including initial transmission and retransmission).

In step S701, the UE receives the following RRC configuration information configured by the network device:
  a) DRX related parameters, including: DRX cycle, drx-onDurationTimer, drx-InactivityTimer, drx-HARQ-RTT-TimerUL, drx-RetransmissionTimerUL, etc.;
  b) uplink HARQ process configuration parameters, including: the number of uplink HARQ processes, the state of the HARQ function of each uplink HARQ process (whether the HARQ function is enabled or the HARQ function is disabled);
  c) for each serving cell of the UE, configuring at least one UL BWP, optionally, for each UL BWP in the configured at least one UL BWP, configuring a CG for the UL BWP;
  d) CG configuration parameters, including: CS-RNTI, the number of uplink HARQ processes reserved for CG, and the CG resource period, etc.

In step S702, when the UE receives the PDCCH indicating scheduling of uplink initial transmission or retransmission, the UE determines the state of the HARQ function of the uplink HARQ process used in current uplink transmission:
  a) if the HARQ function of the uplink HARQ process is in the enabled state, performing step S703;
  b) if the HARQ function of the uplink HARQ process is in the disabled state, performing step S704.

In step S703, the UE performs control of drx-RetransmissionTimerUL based on the received PDCCH and the HARQ function in the enabled state.

In step S7031, when the UE receives the PDCCH, the UE stops the drx-RetransmissionTimerUL corresponding to the uplink HARQ process.

In step S7032, the UE starts the drx-HARQ-RTT-TimerUL corresponding to the HARQ process after completing the first repeated transmission for this PUSCH.

In step S7033, if the drx-HARQ-RTT-TimerUL corresponding to the uplink HARQ process times out, the UE starts the drx-RetransmissionTimerUL corresponding to the uplink HARQ process.

In step S704, the UE performs control of drx-RetransmissionTimerUL based on the received PDCCH and the HARQ function in the disabled state.

The moment when the UE stops/starts/restarts the drx-RetransmissionTimerUL corresponding to the uplink HARQ process includes the following six schemes:

Scheme 1: as shown in FIG. 4A, the UE starts or restarts the drx-RetransmissionTimerUL corresponding to the uplink HARQ process at the moment when the PDCCH is received.

Scheme 2: as shown in FIG. 4E, the UE stops the drx-RetransmissionTimerUL corresponding to the uplink HARQ process at the moment when the PDCCH is received. The UE starts the drx-RetransmissionTimerUL corresponding to the uplink HARQ process in the next time symbol after completing the first repeated transmission of this PUSCH.

Scheme 3: as shown in FIG. 4F, the UE stops the drx-RetransmissionTimerUL corresponding to the uplink HARQ process at the moment when the PDCCH is received. The UE starts the drx-RetransmissionTimerUL corresponding to the uplink HARQ process in the next time symbol after completing the last repeated transmission of the PUSCH.

Scheme 4: as shown in FIG. 4B, the UE starts or restarts the drx-RetransmissionTimerUL corresponding to the uplink HARQ process in the next time symbol after completing the first repeated transmission of the PUSCH.

Scheme 5: as shown in FIG. 4D, the UE stops the drx-RetransmissionTimerUL corresponding to the uplink HARQ process at the moment when the first repeated transmission of the PUSCH is completed, and starts the drx-RetransmissionTimerUL corresponding to the uplink HARQ process in the next time symbol after completing the last repeated transmission of the PUSCH.

Scheme 6: as shown in FIG. 4C, the UE starts or restarts the drx-RetransmissionTimerUL corresponding to the uplink HARQ process in the next time symbol after completing the last repeated transmission of the PUSCH.

In step S705, when the UE sends the uplink initial transmission or the uplink retransmission on the configured uplink grant resource, the UE determines according to the state of the HARQ function of the uplink HARQ process used in current uplink transmission:
  a) if the HARQ function of the uplink HARQ process is in the enabled state, performing step S706;
  b) if the HARQ function of the uplink HARQ process is in the disabled state, performing step S707.

In step S706, the UE performs control of drx-RetransmissionTimerUL based on the sent PUSCH and the HARQ function in the enabled state.

In step S7061, when the UE sends one MAC PDU on the configured uplink grant resource, the UE stops the drx-RetransmissionTimerUL corresponding to the uplink HARQ process.

In step S7062, the UE starts the drx-HARQ-RTT-TimerUL corresponding to the HARQ process after completing the first repeated transmission for current PUSCH.

In step S7063, if the drx-HARQ-RTT-TimerUL corresponding to the uplink HARQ process times out, the UE starts the drx-RetransmissionTimerUL corresponding to the uplink HARQ process.

In step S707, the UE sends the uplink initial transmission on the configured uplink grant, and the UE starts or restarts the drx-RetransmissionTimerUL corresponding to the uplink HARQ process.

For the specific moment of stopping and/or starting of drx-RetransmissionTimerUL, there are the following three schemes:

Scheme 1: as shown in FIG. 5A, the UE starts or restarts the drx-RetransmissionTimerUL corresponding to the uplink HARQ process in the next time symbol after completing the first repeated transmission of the PUSCH.

Scheme 2: as shown in FIG. 5B, the UE starts or restarts the drx-RetransmissionTimerUL corresponding to the uplink HARQ process in the next time symbol after completing the last repeated transmission of the PUSCH.

Scheme 3: as shown in FIG. 5C, the UE stops the drx-RetransmissionTimerUL corresponding to the uplink HARQ process at the moment when the first repeated transmission of the PUSCH is completed, the UE starts the drx-RetransmissionTimerUL corresponding to the uplink HARQ process in the next time symbol after completing the last repeated transmission of the PUSCH.

In an example, the UE receives the following RRC configuration information of the network device: DRX-related parameters including DRX cycle, drx-onDuration-Timer, drx-InactivityTimer, drx-HARQ-RTT-TimerUL, drx-RetransmissionTimerUL, etc.; configuring 2 uplink HARQ processes for the UE, namely HARQ ID 0 and HARQ ID 1, where the HARQ functions of the two uplink HARQ processes are disabled; for the UE's serving cell, configuring one UL BWP, and configuring CG for the UL BWP, where the downlink HARQ used by the CG is HARQ ID 0.

Figure 10:
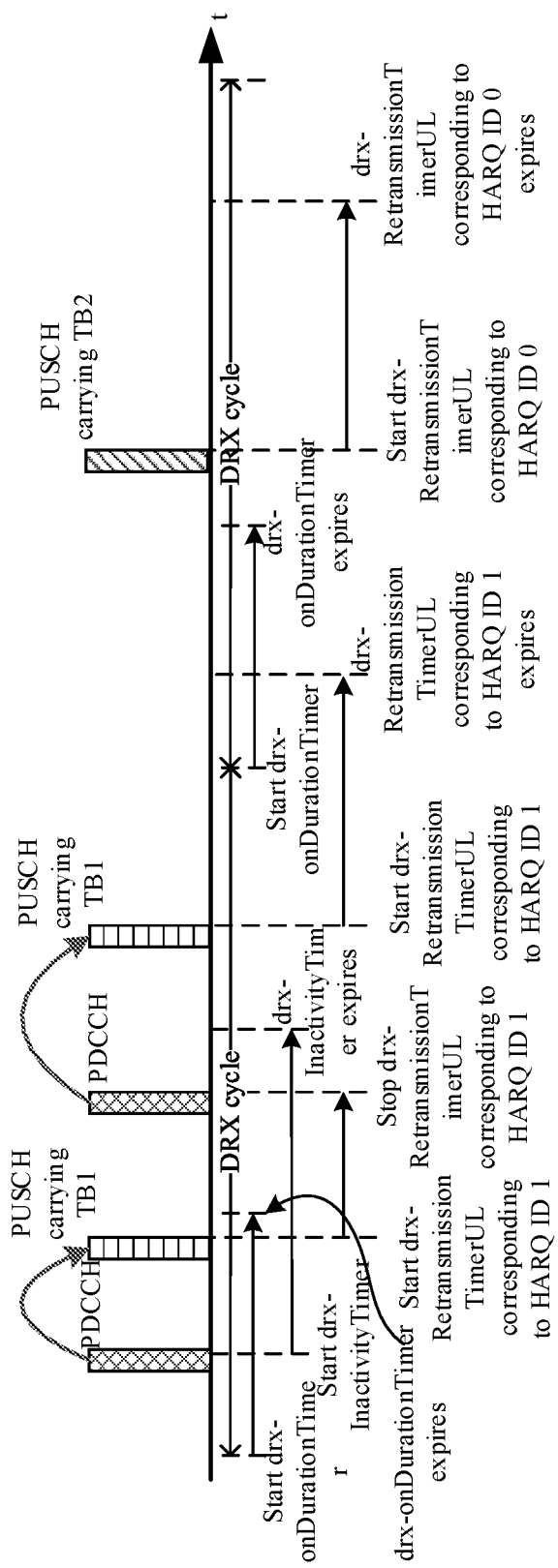
FIG. 10 is an optional timing sequence diagram of a discontinuous reception method according to an embodiment of the present disclosure.

As shown in FIG. 10, when drx-onDurationTimer or drx-InactivityTimer is running, the UE receives the PDCCH indicating the initial transmission of TB1, the HARQ used for transmitting TB1 is HARQ ID 1, the UE sends the PUSCH on the resource indicated by the PDCCH, and the UE starts the drx-RetransmissionTimerUL corresponding to HARQ ID 1 after completing the PUSCH transmission. The UE receives the PDCCH indicating the retransmission of TB1, and the UE stops the drx-RetransmissionTimerUL corresponding to the HARQ ID 1 after completing the reception of the PDCCH indicating the retransmission of TB1. The UE sends the PUSCH on the resource indicated by the PDCCH, and the UE starts the drx-RetransmissionTimerUL corresponding to HARQ ID 1 after completing the PUSCH transmission.

As shown in FIG. 10, the UE sends the initial transmission of TB2 on the CG resource, and the uplink HARQ ID 0 is used for this transmission. The UE starts the drx-RetransmissionTimerUL corresponding to HARQ ID 0 after completing the PUSCH transmission. The UE runs the drx-RetransmissionTimerUL corresponding to HARQ ID 0 until the drx-RetransmissionTimerUL times out.

In a fourth example, for an uplink HARQ process with the HARQ function disabled, the UE only starts or restarts the discontinuous reception uplink retransmission timer corresponding to the HARQ process during uplink initial transmission.

In step S801, the UE receives the following RRC configuration information configured by the network device:
 a) DRX related configuration, including: DRX cycle, drx-onDurationTimer, drx-InactivityTimer, drx-HARQ-RTT-TimerUL, drx-RetransmissionTimerUL, etc.;
 b) uplink HARQ process configuration parameters, including: the number of uplink HARQ processes, the state of the HARQ function of each uplink HARQ process (whether the HARQ function is enabled or the HARQ function is disabled);
 c) for each serving cell of the UE, configuring at least one UL BWP, optionally, for each UL BWP in the configured at least one UL BWP, configuring a CG for the UL BWP;
 d) CG configuration parameters, including: CS-RNTI, the number of uplink HARQ processes reserved for CG, and the CG resource period, etc.

In step S802, when the UE receives the PDCCH indicating scheduling of uplink initial transmission, the UE determines the state of the HARQ function of the uplink HARQ process used in current uplink transmission:
 a) if the HARQ function of the uplink HARQ process is in the enabled state, performing step S803;
 b), if the HARQ function of the uplink HARQ process is in the disabled state, performing step S804.

In step S803, the UE performs control of drx-RetransmissionTimerUL based on the received PDCCH and the HARQ function in the enabled state.

In step S8031, when the UE receives the PDCCH, the UE stops the drx-RetransmissionTimerUL corresponding to the uplink HARQ process.

In step S8032, the UE starts the drx-HARQ-RTT-TimerUL corresponding to the HARQ process after completing the first repeated transmission for the PUSCH.

In step S8033, if the drx-HARQ-RTT-TimerUL corresponding to the uplink HARQ process times out, the UE starts the drx-RetransmissionTimerUL corresponding to the uplink HARQ process.

In step S804, the UE performs control of drx-RetransmissionTimerUL based on the received PDCCH and the HARQ function in the disabled state.

The schemes for the moment when the UE stops/starts/restarts the drx-RetransmissionTimerUL corresponding to the uplink HARQ process are the same as the schemes described in step S704, and will not be repeated here.

In step S805, when the UE sends the uplink initial transmission on the configured uplink grant resources, it determines the state of the HARQ function of the uplink HARQ process used in this uplink transmission:
 a) if the HARQ function of the uplink HARQ process is in the enabled state, performing step S806;
 b), if the HARQ function of the uplink HARQ process is in the disabled state, performing step S807.

In step S806, the UE performs control of drx-RetransmissionTimerUL based on the sent uplink initial transmission and the HARQ function in the enabled state.

In step S8061, when the UE sends one MAC PDU on the configured uplink grant resource, the UE stops the drx-RetransmissionTimerUL corresponding to the uplink HARQ process.

In step S8062, the UE starts the drx-HARQ-RTT-TimerUL corresponding to the HARQ process after completing the first repeated transmission for the PUSCH.

In step S8063, if the drx-HARQ-RTT-TimerUL corresponding to the uplink HARQ process times out, the UE starts the drx-RetransmissionTimerUL corresponding to the uplink HARQ process.

In step S807, the UE sends the uplink initial transmission on the configured uplink grant, and the UE starts or restarts the drx-RetransmissionTimerUL corresponding to the uplink HARQ process.

The schemes for the moment when the UE stops and/or starts the drx-RetransmissionTimerUL are the same as the schemes described in step S707, and will not be repeated here.

In step S808, the UE receives the PDCCH indicating scheduling of uplink retransmission, and the retransmission and initial transmission of the same TB use the same HARQ process, then the UE determines the state of the HARQ function of the uplink HARQ process used in this uplink transmission:
 a) if the HARQ function of the uplink HARQ process is in the enabled state, performing step S803;

b), if the HARQ function of the uplink HARQ process is in the disabled state, performing step S809.

In step S809, the UE sends a retransmission on the resource indicated by the PDCCH, while the drx-RetransmissionTimerUL corresponding to the uplink HARQ process continues to run.

In an example, the UE receives the following RRC configuration information of the network device: DRX-related parameters including DRX cycle, drx-onDurationTimer, drx-InactivityTimer, drx-HARQ-RTT-TimerUL, drx-RetransmissionTimerUL, etc.; configuring 2 uplink HARQ processes for the UE, namely HARQ ID 0 and HARQ ID 1, where the HARQ functions of the two downlink HARQ processes are in the disabled state; for the UE's serving cell, configuring one UL BWP, and configuring CG for the UL BWP, where the downlink HARQ used by the CG is HARQ ID 0.

Figure 11:
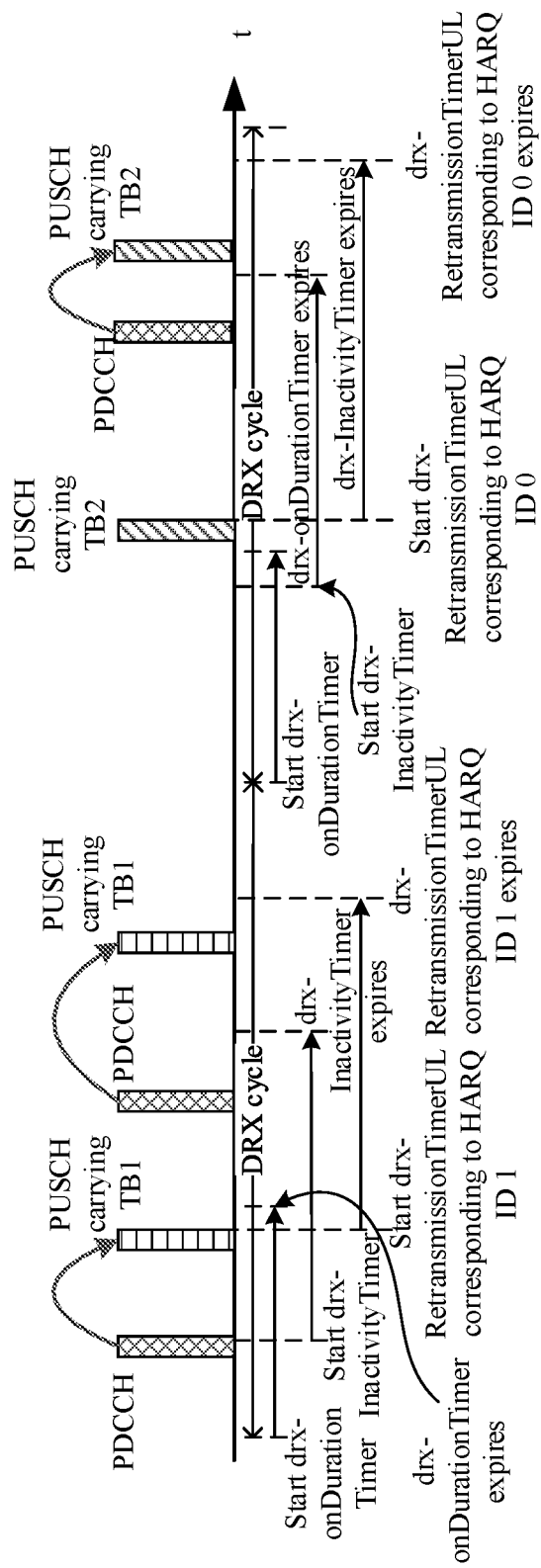
FIG. 11 is an optional timing sequence diagram of a discontinuous reception method according to an embodiment of the present disclosure.

As shown in FIG. 11, when the drx-onDurationTimer or drx-InactivityTimer is running, the UE receives the PDCCH indicating the initial transmission of TB1, and TB1 is transmitted by using HARQ ID 1. The UE sends the PUSCH on the resource indicated by the PDCCH, and the UE starts the drx-RetransmissionTimerUL corresponding to HARQ ID 1 after completing the PUSCH transmission. The UE receives the PDCCH indicating retransmission of TB1, sends the PUSCH on the resource indicated by the PDCCH indicating retransmission of TB1, and continues to run the drx-RetransmissionTimerUL corresponding to HARQ ID 1 until the drx-RetransmissionTimerUL times out.

As shown in FIG. 11, the UE sends the initial transmission of TB2 on the CG resource, and the uplink HARQ ID 0 is used for this transmission. The UE starts the drx-RetransmissionTimerUL corresponding to HARQ ID 0 after completing the PUSCH transmission. The UE receives the PDCCH indicating the retransmission of TB2, the UE sends the PUSCH on the resource indicated by the PDCCH, and continues to run the drx-RetransmissionTimerUL corresponding to HARQ ID 0 until the drx-RetransmissionTimerUL times out.

Figure 12:
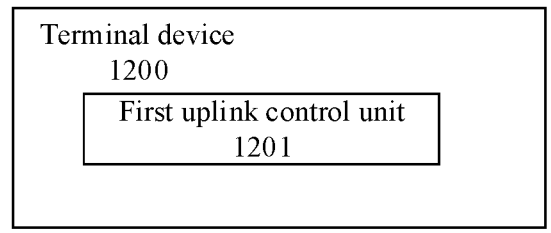
FIG. 12 is an optional schematic structural diagram of a terminal device according to an embodiment of the present disclosure.

To implement the above discontinuous reception method, the embodiments of the present disclosure further provides a terminal device. The composition structure of the terminal device is shown in FIG. 12, and the terminal device 1200 includes:

a first uplink control unit 1201, configured to run a discontinuous reception (DRX) uplink retransmission timer corresponding to an uplink Hybrid Automatic Repeat reQuest (HARQ) process used for transmitting uplink data, after receiving a physical downlink control channel (PDCCH) indicating scheduling of transmission of the uplink data and/or after sending a physical uplink shared channel (PUSCH) carrying the uplink data, in a case that an HARQ function of the uplink HARQ process is in a disabled state.

In the embodiments of the present disclosure, the first uplink control unit is further configured to:
in a case of receiving the PDCCH indicating scheduling of transmission of the uplink data, and sending the PUSCH on a resource indicated by the PDCCH, run the DRX uplink retransmission timer corresponding to the uplink HARQ process in one of following cases:
after receiving the PDCCH indicating scheduling of transmission of the uplink data;
after sending the PUSCH; and
after receiving the PDCCH indicating scheduling of transmission of the uplink data and after sending the PUSCH.

In the embodiments of the present disclosure, the PDCCH indicates scheduling of initial transmission or retransmission of the uplink data.

In the embodiments of the present disclosure, the first uplink control unit 1201 is further configured to:
start or restart the DRX uplink retransmission timer at a moment when a reception of the PDCCH indicating scheduling of transmission of the uplink data is completed.

In the embodiments of the present disclosure, the first uplink control unit 1201 is further configured to perform one of the following:
starting or restarting the DRX uplink retransmission timer in a next symbol after completing sending of a first repeated transmission of the PUSCH;
starting or restarting the DRX uplink retransmission timer in a next symbol after completing sending of a last repeated transmission of the PUSCH; and
stopping the DRX uplink retransmission timer in a next symbol after completing sending of a first repeated transmission of the PUSCH, and starting or restarting the DRX uplink retransmission timer in a next symbol after completing sending of a last repeated transmission of the PUSCH.

In the embodiments of the present disclosure, the first uplink control unit 1201 is further configured to:
stop the DRX uplink retransmission timer at a moment when a reception of the PDCCH indicating scheduling of transmission of the uplink data is completed, and start the DRX uplink retransmission timer in a next symbol after completing sending of a first repeated transmission of the PUSCH; or
stop the DRX uplink retransmission timer at a moment when the PDCCH indicating scheduling of transmission of the uplink data is completed, and start the DRX uplink retransmission timer in a next symbol after completing sending of a last repeated transmission of the PUSCH.

In the embodiments of the present disclosure, the first uplink control unit 1201 is further configured to: run the DRX uplink retransmission timer corresponding to the uplink HARQ process after sending the PUSCH, in a case that the PUSCH is sent on a configured grant resource configured by a network device.

In the embodiments of the present disclosure, an initial transmission of the uplink data is performed on the PUSCH.

In the embodiments of the present disclosure, the first uplink control unit 1201 is further configured to perform one of the following:
starting or restarting the DRX uplink retransmission timer in a next symbol after completing a reception of a first repeated transmission of the PUSCH;
starting or restarting the DRX uplink retransmission timer in a next symbol after completing a reception of a last repeated transmission of the PUSCH; and
stopping the DRX uplink retransmission timer in a next symbol after completing a reception of a first repeated transmission of the PUSCH, and starting or restarting the DRX uplink retransmission timer in a next symbol after completing a reception of a last repeated transmission of the PUSCH.

In the embodiments of the present disclosure, the first uplink control unit 1201 is further configured to:
keep the DRX uplink retransmission timer running, after receiving the PDCCH indicating scheduling of transmission of the uplink data and/or after sending the PUSCH carrying the uplink data.

In the embodiments of the present disclosure, the terminal device further includes:

a second uplink control unit, configured to not run a DRX HARQ uplink round trip transmission time timer corresponding to the uplink HARQ process, in the case that the HARQ function of the uplink HARQ process is in the disabled state.

The embodiments of the present disclosure also provides a terminal device including a processor and a memory for storing a computer program executable on the processor, where the processor is configured to execute the steps of the discontinuous reception method executed by the above terminal device 1200 when running the computer program.

Figure 13:
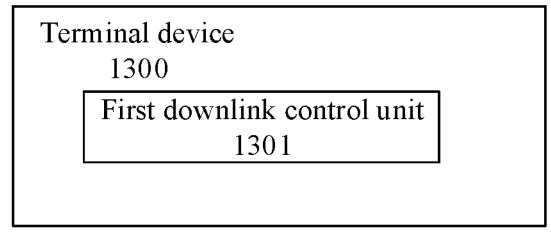
FIG. 13 is an optional schematic structural diagram of a terminal device according to an embodiment of the present disclosure.

The embodiments of the present disclosure further provide a terminal device. The composition structure of the terminal device is shown in FIG. 13, and the terminal device 1300 includes:

a first downlink control unit 1301, configured to run a DRX downlink retransmission timer corresponding to a downlink Hybrid Automatic Repeat reQuest (HARQ) process used for transmitting downlink data, after receiving a physical downlink control channel (PDCCH) indicating scheduling of transmission of the downlink data and/or after receiving a physical downlink shared channel (PDSCH) carrying the downlink data, in a case that an HARQ function of the downlink HARQ process is in a disabled state.

In the embodiments of the present disclosure, the first downlink control unit 1301 is further configured to:

in a case of receiving the PDCCH indicating scheduling of transmission of the downlink data, and receiving the PDSCH on a resource indicated by the PDCCH, run the DRX downlink retransmission timer corresponding to the downlink HARQ process in one of following cases:

after receiving the PDCCH indicating scheduling of transmission of the downlink data;

after receiving the PDSCH; and after receiving the PDCCH indicating scheduling of transmission of the downlink data and after receiving the PDSCH.

In the embodiments of the present disclosure, the PDCCH indicates scheduling of initial transmission or retransmission of the downlink data.

In the embodiments of the present disclosure, the first downlink control unit 1301 is further configured to: start or restart the DRX downlink retransmission timer at a moment when a reception of the PDCCH indicating scheduling of transmission of the downlink data is completed.

In the embodiments of the present disclosure, the first downlink control unit 1301 is further configured to perform one of the following:

starting or restarting the DRX downlink retransmission timer in a next symbol after completing receiving of a first repeated transmission of the PDSCH;

starting or restarting the DRX downlink retransmission timer in a next symbol after completing receiving of a last repeated transmission of the PDSCH; and stopping the DRX downlink retransmission timer in a next symbol after completing receiving of a first repeated transmission of the PDSCH, and starting or restarting the DRX downlink retransmission timer in a next symbol after completing a transmission of a last repeated transmission of the PDSCH.

In the embodiments of the present disclosure, the first downlink control unit 1301 is further configured to:

stop the DRX downlink retransmission timer at a moment when a reception of the PDCCH indicating scheduling of transmission of the downlink data is completed, and start the DRX downlink retransmission timer in a next symbol after completing receiving of a first repeated transmission of the PDSCH; or stop the DRX downlink retransmission timer at a moment when a reception of the PDCCH indicating scheduling of transmission of the downlink data is completed, and start the DRX downlink retransmission timer in a next symbol after completing receiving of a last repeated transmission of the PDSCH.

In the embodiments of the present disclosure, the first downlink control unit 1301 is further configured to:

run the DRX downlink retransmission timer corresponding to the downlink HARQ process after receiving the PDSCH, in a case that the PDSCH is received on a downlink semi-persistent scheduling resource configured by the network device.

In the embodiments of the present disclosure, an initial transmission of the downlink data is received on the PDSCH.

In the embodiments of the present disclosure, the first downlink control unit 1301 is further configured to perform one of the following:

starting or restarting the DRX downlink retransmission timer in a next symbol after completing a reception of a first repeated transmission of the PDSCH;

starting or restarting the DRX downlink retransmission timer in a next symbol after completing a reception of a last repeated transmission of the PDSCH; and stopping the DRX downlink retransmission timer in a next symbol after completing a reception of a first repeated transmission of the PDSCH, and starting or restarting the DRX downlink retransmission timer in a next symbol after completing a reception of a last repeated transmission of the PDSCH.

In the embodiments of the present disclosure, the first downlink control unit 1301 is further configured to:

in a case that the retransmission of the downlink data is received on the PDSCH, keep the DRX downlink retransmission timer running, after receiving the PDCCH indicating scheduling of transmission of the downlink data and/or after receiving the PDSCH carrying the downlink data.

In the embodiments of the present disclosure, the terminal device further includes:

a decoding unit, configured to decode the downlink data carried by the PDSCH;

a second downlink control unit, configured to stop the DRX downlink retransmission timer in a case of correct decoding.

In the embodiments of the present disclosure, the terminal device further includes:

a third downlink control unit, configured to not run a DRX HARQ downlink round trip transmission time timer corresponding to the downlink HARQ process, in the case that the HARQ function of the downlink HARQ process is in the disabled state.

The embodiments of the present disclosure also provides a terminal device including a processor and a memory for storing a computer program executable on the processor, where the processor is configured to execute the steps of the discontinuous reception method executed by the above terminal device 1300 when running the computer program.

Figure 14:
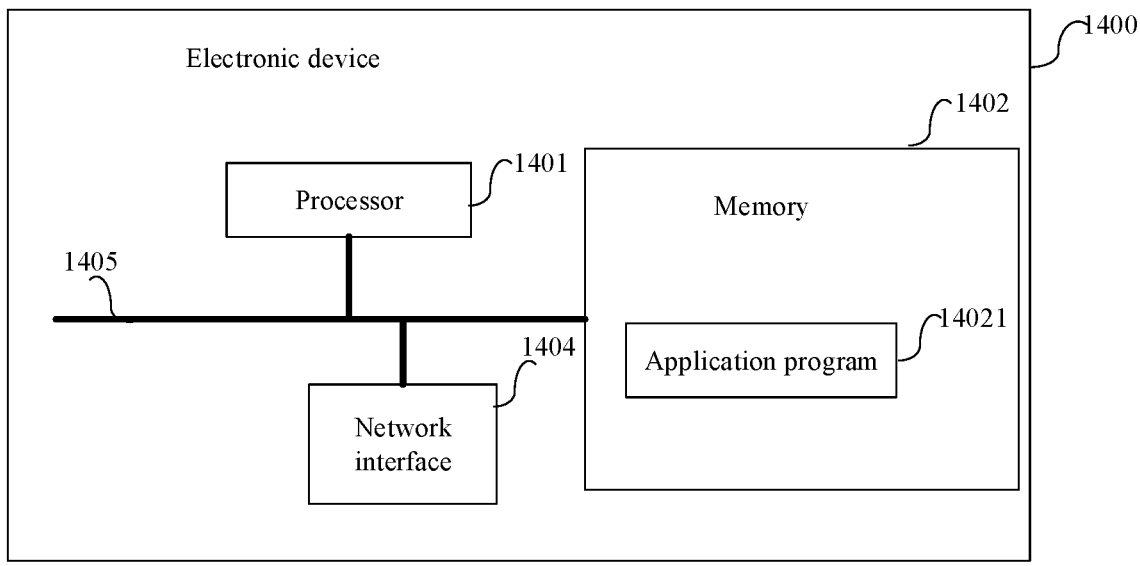
FIG. 14 is an optional schematic structural diagram of an electronic device provided by an embodiment of the present disclosure.

FIG. 14 is a schematic diagram of the hardware composition of an electronic device (terminal device) according to an embodiment of the present disclosure. The electronic device 1400 includes: at least one processor 1401, memory 1402, and at least one network interface 1404. The various components in the electronic device 1400 are coupled together via a bus system 1405. It could be understood that the bus system 1405 is used to implement the connection communication between these components. In addition to the data bus, the bus system 1405 also includes a power bus, a control bus, and a status signal bus. However, for clarity of illustration, the various buses are labeled as bus system 1405 in FIG. 14.

It can be appreciated that the memory 1402 may be either volatile memory or non-volatile memory, and may include both volatile and non-volatile memories. The non-volatile memory may be an ROM, a Programmable Read-Only Memory (PROM), an Erasable Programmable Read-Only Memory (EPROM), an Electrically Erasable Programmable Read-Only Memory (EEPROM), a Ferromagnetic Random Access Memory (FRAM), a Flash Memory, a Magnetic Surface Memory, an optical disc, a Compact Disc Read-Only Memory (CD-ROM); and the Magnetic Surface Memory may be a disk memory or a tape memory. The volatile memory may be a Random Access Memory (RAM), which is used as an external cache. By way of illustration, but not limitation, many forms of RAM are available, such as a Static Random Access Memory (SRAM), a Synchronous Static Random Access Memory (SSRAM), a Dynamic Random Access Memory (DRAM), a Synchronous Dynamic Random Access Memory (SDRAM), a Double Data Rate Synchronous Dynamic Random Access Memory (DDRSDRAM), an Enhanced Synchronous Dynamic Random Access Memory (ESDRAM), a SyncLink Dynamic Random Access Memory (SLDRAM), and a Direct Rambus Random Access Memory (DRRAM). The memory 1402 described in the embodiments of the present disclosure is intended to include, but not be limited to, these and any other suitable types of memory.

The memory 1402 in the embodiments of the present disclosure is used to store various types of data to support the operations of the electronic device 1400. Examples of such data include: any computer program for operating on the electronic device 1400, such as application program 14021. Programs for implementing the methods according to the embodiments of the present disclosure may be included in the application program 14021.

The methods disclosed in the above embodiments of the present disclosure may be applied to the processor 1401 or implemented by the processor 1401. The processor 1401 may be a type of integrated circuit chip with a signal processing capability. In the realization process, each step of the aforementioned methods may be completed through integrated logic circuits of hardware or instructions in a form of software in the processor 1401. The aforementioned processor 1401 may be a general-purpose processor, a digital signal processor (DSP), or other programmable logic devices, discrete gates or transistor logic devices, discrete hardware components, etc. Each method, step and logic block diagram disclosed in the embodiments of the present disclosure may be implemented or performed by the processor 1401. The general-purpose processor may be a microprocessor, or the processor may also be any conventional processor, etc. The steps of the methods disclosed in combination with the embodiments of the present disclosure may be directly completed by a hardware decoding processor, or completed by a combination of hardware and a software module in the decoding processor. The software module may be located in a storage medium, the storage medium is located in the memory 1402, and the processor 1401 reads information in the memory 1402 so as to complete the steps of the aforementioned methods in conjunction with its hardware.

In an exemplary embodiment, the electronic device 1400 may be implemented by one or more Application Specific Integrated Circuit (ASIC), DSP, Programmable Logic Device (PLD), Complex Programmable Logic Device (CPLD), FPGA, general-purpose processor, controller, MCU, MPU, or other electronic component, so as to perform the aforementioned method.

The embodiments of the present disclosure also provide a storage medium for storing a computer program.

Optionally, the computer-readable storage medium is applicable to the terminal device in the embodiments of the present disclosure, and the computer program causes a computer to perform the corresponding process in each method of the embodiments of the present disclosure, which is not repeatedly described here for simplicity.

The present disclosure is described with reference to flowchart and/or block diagrams of methods, devices (systems), and computer program products according to the embodiments of the present disclosure. It should be understood that each process and/or block in the flowchart and/or block diagrams, and combinations of processes and/or blocks in the flowchart and/or block diagrams, can be implemented by the computer program instructions. These computer program instructions may be provided to the processor of a general purpose computer, a special purpose computer, an embedded processor or other programmable data processing device to produce a machine, such that the instructions executed by the processor of the computer or other programmable data processing devices produce an apparatus for implementing the functions specified in one process or more processes of the flowchart and/or one block or more blocks of the block diagram.

These computer program instructions may also be stored in a computer readable memory capable of directing a computer or other programmable data processing device to operate in a particular manner, such that the instructions stored in the computer readable memory produce an article of manufacture including an instruction apparatus which is used to implement the functions specified in one or more processes of the flowchart and/or one or more blocks of the block diagram.

These computer program instructions may also be loaded onto a computer or other programmable data processing device such that a series of operational steps are executed on the computer or other programmable device to produce computer-implemented processing, such that the instructions executed on the computer or other programmable device provide steps for implementing the functions specified in one or more processes of the flowchart and/or one or more blocks of the block diagram.

The above mentioned are merely embodiments of the present disclosure, and are not intended to limit the protection scope of the present disclosure. Any modifications, equivalent replacements and improvements made within the spirit and principles of the present disclosure shall be included within the protection scope of the present disclosure.

What is claimed is:

1. A discontinuous reception (DRX) method, comprising:
running, by a terminal device, a DRX uplink retransmission timer corresponding to an uplink Hybrid Automatic Repeat reQuest (HARQ) process used for transmitting uplink data, in one of following cases: after receiving a physical downlink control channel (PDCCH) indicating scheduling of transmission of the uplink data, after sending a physical uplink shared channel (PUSCH) carrying the uplink data, and after receiving the PDCCH indicating scheduling of transmission of the uplink data and after sending the PUSCH carrying the uplink data, in a case that an HARQ function of the uplink HARQ process is in a disabled state.

2. The method according to claim 1, wherein in a case of receiving the PDCCH indicating scheduling of transmission of the uplink data, and sending the PUSCH on a resource indicated by the PDCCH, the terminal device runs the DRX uplink retransmission timer corresponding to the uplink HARQ process in one of following cases:
after receiving the PDCCH indicating scheduling of transmission of the uplink data;
after sending the PUSCH; and
after receiving the PDCCH indicating scheduling of transmission of the uplink data and after sending the PUSCH.

3. The method according to claim 2, wherein the PDCCH indicates scheduling of initial transmission or retransmission of the uplink data.

4. The method according to claim 2, wherein the running the DRX uplink retransmission timer corresponding to the uplink HARQ process, after receiving the PDCCH indicating scheduling of transmission of the uplink data, comprises:
starting or restarting the DRX uplink retransmission timer at a moment when a reception of the PDCCH indicating scheduling of transmission of the uplink data is completed;
or,
wherein the running the DRX uplink retransmission timer corresponding to the uplink HARQ process, after sending the PUSCH, comprises one of the following:
starting or restarting the DRX uplink retransmission timer in a next symbol after completing sending of a first repeated transmission of the PUSCH;
starting or restarting the DRX uplink retransmission timer in a next symbol after completing sending of a last repeated transmission of the PUSCH; and
stopping the DRX uplink retransmission timer in the next symbol after completing sending of the first repeated transmission of the PUSCH, and starting or restarting the DRX uplink retransmission timer in the next symbol after completing sending of the last repeated transmission of the PUSCH;
or,
wherein the running the DRX uplink retransmission timer corresponding to the uplink HARQ process, after receiving the PDCCH indicating scheduling of transmission of the uplink data and after sending the PUSCH, comprises:
stopping the DRX uplink retransmission timer at a moment when a reception of the PDCCH indicating scheduling of transmission of the uplink data is completed, and starting the DRX uplink retransmission timer in a next symbol after completing sending of a first repeated transmission of the PUSCH; or
stopping the DRX uplink retransmission timer at a moment when a reception of the PDCCH indicating scheduling of transmission of the uplink data is completed, and starting the DRX uplink retransmission timer in a next symbol after completing sending of a last repeated transmission of the PUSCH.

5. A terminal device, comprising:
a processor and a memory for storing a computer program executable on the processor, wherein
the processor is configured to:
run a discontinuous reception (DRX) uplink retransmission timer corresponding to an uplink Hybrid Automatic Repeat reQuest (HARQ) process used for transmitting uplink data, in one of following cases: after receiving a physical downlink control channel (PDCCH) indicating scheduling of transmission of the uplink data, after sending a physical uplink shared channel (PUSCH) carrying the uplink data, and after receiving the PDCCH indicating scheduling of transmission of the uplink data and after sending the PUSCH carrying the uplink data, in a case that an HARQ function of the uplink HARQ process is in a disabled state.

6. The terminal device according to claim 5, wherein the processor is further configured to, in a case that the PUSCH is sent on a configured grant resource configured by a network device, run the DRX uplink retransmission timer corresponding to the uplink HARQ process after sending the PUSCH.

7. The terminal device according to claim 6, wherein an initial transmission of the uplink data is performed on the PUSCH.

8. The terminal device according to claim 6, wherein the processor is further configured to perform one of the following:
starting or restarting the DRX uplink retransmission timer in a next symbol after completing a reception of a first repeated transmission of the PUSCH;
starting or restarting the DRX uplink retransmission timer in a next symbol after completing a reception of a last repeated transmission of the PUSCH; and
stopping the DRX uplink retransmission timer in the next symbol after completing the reception of the first repeated transmission of the PUSCH, and starting or restarting the DRX uplink retransmission timer in the next symbol after completing the reception of the last repeated transmission of the PUSCH.

9. The terminal device according to claim 5, wherein the processor is further configured to:
keep the DRX uplink retransmission timer running, in one of following cases: after receiving the PDCCH indicating scheduling of transmission of the uplink data, after sending the PUSCH carrying the uplink data, and after receiving the PDCCH indicating scheduling of transmission of the uplink data and after sending the PUSCH carrying the uplink data.

10. The terminal device according to claim 5, wherein the processor is further configured to:
not run a DRX HARQ uplink round trip transmission time timer corresponding to the uplink HARQ process, in the case that the HARQ function of the uplink HARQ process is in the disabled state.

11. A terminal device, comprising:
a processor and a memory for storing a computer program executable on the processor, wherein
the processor is configured to:
run a DRX downlink retransmission timer corresponding to a downlink Hybrid Automatic Repeat reQuest (HARQ) process used for transmitting downlink data, in one of following cases: after receiving a physical downlink control channel (PDCCH) indicating scheduling of transmission of the downlink data, after receiving a physical downlink shared channel (PDSCH)

carrying the downlink data, and after receiving the PDCCH indicating scheduling of transmission of the uplink data and after sending the PUSCH carrying the uplink data, in a case that an HARQ function of the downlink HARQ process is in a disabled state.

12. The terminal device according to claim 11, wherein the processor is further configured to:
in a case of receiving the PDCCH indicating scheduling of transmission of the downlink data, and receiving the PDSCH on a resource indicated by the PDCCH, run the DRX downlink retransmission timer corresponding to the downlink HARQ process in one of following cases:
after receiving the PDCCH indicating scheduling of transmission of the downlink data;
after receiving the PDSCH; and
after receiving the PDCCH indicating scheduling of transmission of the downlink data and after receiving the PDSCH.

13. The terminal device according to claim 12, wherein the PDCCH indicates scheduling of initial transmission or retransmission of the downlink data.

14. The terminal device according to claim 11, wherein the processor is further configured to: start or restart the DRX downlink retransmission timer at a moment when a reception of the PDCCH indicating scheduling of transmission of the downlink data is completed,
or,
wherein the processor is further configured to perform one of the following:
starting or restarting the DRX downlink retransmission timer in a next symbol after completing receiving of a first repeated transmission of the PDSCH;
starting or restarting the DRX downlink retransmission timer in a next symbol after completing receiving of a last repeated transmission of the PDSCH; and
stopping the DRX downlink retransmission timer in the next symbol after completing receiving of the first repeated transmission of the PDSCH, and starting or restarting the DRX downlink retransmission timer in the next symbol after completing receiving of the last repeated transmission of the PDSCH,
or,
wherein the processor is further configured to:
stop the DRX downlink retransmission timer at a moment when a reception of the PDCCH indicating scheduling of transmission of the downlink data is completed, and start the DRX downlink retransmission timer in a next symbol after completing receiving of a first repeated transmission of the PDSCH; or
stop the DRX downlink retransmission timer at a moment when a reception of the PDCCH indicating scheduling of transmission of the downlink data is completed, and start the DRX downlink retransmission timer in a next symbol after completing receiving of a last repeated transmission of the PDSCH.

15. The terminal device according to claim 11, wherein the processor is further configured to: run the DRX downlink retransmission timer corresponding to the downlink HARQ process after receiving the PDSCH, in a case that the PDSCH is received on a downlink semi-persistent scheduling resource configured by a network device.

16. The terminal device according to claim 15, wherein an initial transmission of the downlink data is performed on the PDSCH.

17. The terminal device according to claim 15, wherein the processor is further configured to perform one of the following:
starting or restarting the DRX downlink retransmission timer in a next symbol after completing a reception of a first repeated transmission of the PDSCH;
starting or restarting the DRX downlink retransmission timer in a next symbol after completing a reception of a last repeated transmission of the PDSCH; and
stopping the DRX downlink retransmission timer in the next symbol after completing the reception of the first repeated transmission of the PDSCH, and starting or restarting the DRX downlink retransmission timer in the next symbol after completing the reception of the last repeated transmission of the PDSCH.

18. The terminal device according to claim 11, wherein the processor is further configured to: in a case that the retransmission of the downlink data is received on the PDSCH, keep the DRX downlink retransmission timer running, in one of following cases: after receiving the PDCCH indicating scheduling of transmission of the downlink data, after receiving the PDSCH carrying the downlink data, and after receiving the PDCCH indicating scheduling of transmission of the uplink data and after sending the PUSCH carrying the uplink data.

19. The terminal device according to claim 11, wherein the processor is further configured to:
decode the downlink data carried by the PDSCH; and
stop the DRX downlink retransmission timer in a case that the decoding is correct.

20. The terminal device according to claim 11, wherein the processor is further configured to:
not run a DRX HARQ downlink round trip transmission time timer corresponding to the downlink HARQ process, in the case that the HARQ function of the uplink HARQ process is in the disabled state.

* * * * *